(12) United States Patent
Ikeda

(10) Patent No.: US 6,763,919 B2
(45) Date of Patent: *Jul. 20, 2004

(54) DUAL MODE DRUM BRAKE DEVICE

(75) Inventor: Takashi Ikeda, Owariasahi (JP)

(73) Assignee: Nisshinbo Industries Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/870,994

(22) Filed: Jun. 1, 2001

(65) Prior Publication Data

US 2002/0014378 A1 Feb. 7, 2002

(30) Foreign Application Priority Data

Jun. 1, 2000 (JP) ........................................ 2000-164539

(51) Int. Cl.[7] ........................... F16D 51/00; F16D 65/52
(52) U.S. Cl. .................................. 188/79.51; 188/196 R
(58) Field of Search ............................... 188/79.51, 75, 188/79.54, 79.55, 79.56, 71.9, 196 D, 325, 328, 196 R

(56) References Cited

U.S. PATENT DOCUMENTS

| | | | |
|---|---|---|---|
| 1,513,740 A | | 11/1924 | Walter |
| 3,783,981 A | * | 1/1974 | Burgdorf ................ 188/106 F |
| 3,838,757 A | | 10/1974 | Farr |
| 4,270,633 A | * | 6/1981 | Coulter et al. ........ 188/79.5 GC |
| 4,480,726 A | * | 11/1984 | Idesawa .................. 188/79.5 P |
| 4,533,024 A | * | 8/1985 | Rath ...................... 188/79.5 B |
| 4,678,067 A | | 7/1987 | Thompson |
| 4,705,147 A | * | 11/1987 | Pressaco et al. ......... 188/196 D |
| 4,792,021 A | | 12/1988 | Fukuzawa et al. |
| 4,809,826 A | * | 3/1989 | Charbonnier ............ 188/79.52 |
| 5,062,504 A | | 11/1991 | Yamamoto |
| 5,246,091 A | * | 9/1993 | Brooks, Sr. ............. 188/196 D |
| 5,275,260 A | * | 1/1994 | Evans et al. ............. 188/79.64 |
| 5,310,026 A | * | 5/1994 | Shaw et al. .................. 188/156 |
| 6,065,571 A | * | 5/2000 | Ikeda ....................... 188/79.61 |
| 6,082,505 A | * | 7/2000 | Asai et al. ................ 188/79.54 |
| 6,131,708 A | * | 10/2000 | Fujiwara .................. 188/250 E |
| 6,302,245 B1 | * | 10/2001 | Ikeda ....................... 188/79.51 |

FOREIGN PATENT DOCUMENTS

| | | | |
|---|---|---|---|
| EP | 0 419 171 A | | 3/1991 |
| EP | 0896167 A2 | * | 2/1999 |
| EP | 0 908 641 A | | 4/1999 |
| JP | 10299801 A | * | 11/1998 |
| JP | 11117965 A | * | 4/1999 |
| JP | 11303909 A | * | 11/1999 |

* cited by examiner

Primary Examiner—Jack Lavinder
Assistant Examiner—Melody M. Burch
(74) Attorney, Agent, or Firm—Apex Juris, pllc; Tracy M Heims

(57) ABSTRACT

A dual mode drum brake device of this invention is subject to lightning and low-cost without over braking during the parking brake operation. Pistons 10, 11 in a cylinder device 9 push and rotate brake shoes 2, 3 to be separated apart around an abutment point with an anchor 8 during the service brake operation, thereby functioning as a leading trailing brake. An operation force W of the parking brake rotates a lever 14 in a counterclockwise direction around a pin 13, one end of the lever 14 rotates the brake shoe 3 outwardly around a protuberance 12a via the pin 13, and the other end of the lever 1 rotates the lever 12 in a clockwise direction via a strut 15 around the protuberance 12a to rotate the brake shoe 2 outwardly around the abutment point with the anchor 8 via the protuberance 12a. The brake shoe 2 or 3 positioned at a side adjacent to the rotational direction of a drum is trailed by the drum, transmitting the drum rotational force to the remaining brake shoe 3 or 2 via the pistons 10, 11, and ultimately being received by the anchor 8, thereby functioning as a duo servo type brake. Members transmitting the rotational force between the brake shoes 2, 3 are the pistons 10, 11, which increases a distance Y between the members and the drum center and enables to maintain a smallest required braking force.

6 Claims, 15 Drawing Sheets

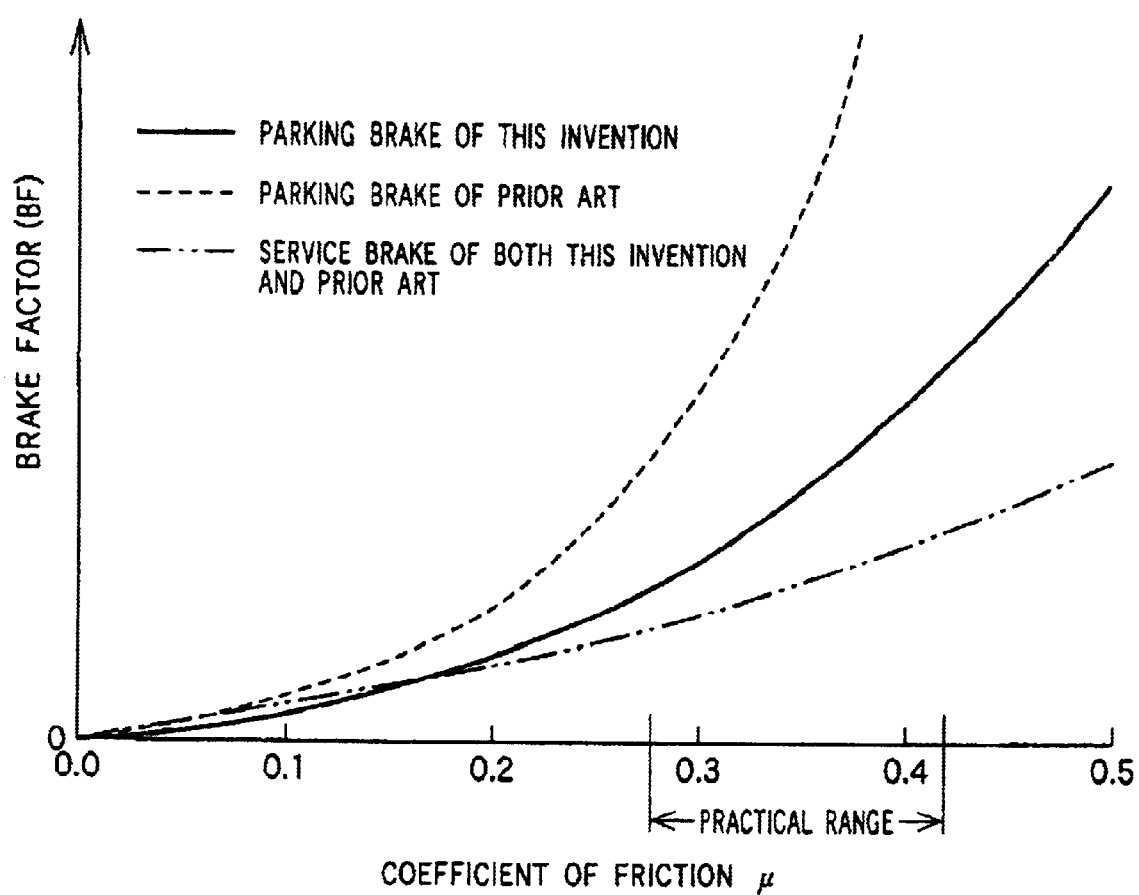
F I G. 12

DUAL MODE DRUM BRAKE DEVICE

BACKGROUND OF INVENTION

1. Field of the Invention

This invention relates to an improvement in a dual mode drum brake device which functions as a leading-trailing (LT) type brake device during the service brake operation and functions as a duo servo (DS) type brake device during the parking brake operation.

2. Prior Art

A drum brake as described in the Japanese Provisional Patent Publication No. 10-110758 is known to be an example of a dual mode drum brake device, the summarized operation of which is shown in FIGS. 13–16. Summary of the drum brake device in its inactivated state is explained with reference to FIG. 13. A pair of brake shoes 111, 112 are positioned to face each other, wherein the fixed cylinder device 113 is positioned between adjacent ends of the brake shoes 111, 112 at one end while the fixed anchor 114 is positioned between adjacent ends of the brake shoes 111, 112 at the other end.

A pivot lever 116 is pivotally supported on the brake shoe 111 by a pin 115 between both ends of the brake shoe 111 while a parking brake lever 118 is pivotally supported on the brake shoe 112 by a pin 117 at the end portion of the brake shoe 112 adjacent to the anchor 114.

A first strut 119 is extended between a pivot section of the brake lever 118 and one free end of the pivot lever 116 adjacent to the anchor 114 while a second strut 120 is extended between the other free end of the pivot lever 116 as well as an upper end of the brake shoe 111 adjacent to the cylinder device 113 and the upper side of the brake shoe 112 corresponding to the free end of the pivot lever 116 and the brake shoe 111.

When a service brake operates via a foot brake pedal, the cylinder device 113 is pressurized to advance two pistons housed therein moving both brake shoes 111, 112 outward from positions shown in FIG. 13 to rotate and separate the same brake shoes apart, pivoting each at an abutment point with the anchor 114. Accordingly, the brake shoes 111, 112 frictionally engage with the inner circumferential surface of the brake drum, not shown in the figures, to generate the braking force.

The drum brake device operates as a leading-trailing type drum brake where one of the brake shoes 111, 112 becomes a leading shoe in relation to the rotational direction of the brake drum, thereby generating a self-servo property, and the remaining brake shoe becomes a trailing shoe in relation to the rotational direction of the brake drum without a self-servo property.

The parking brake operation is described while referring to the accompanying FIGS. 14–16. If a hand lever, not shown in the figures, is operated to activate the parking brake, the brake lever 118 is pulled in the direction of arrow W in FIG. 14 via members such as a parking brake cable to rotate accordingly pivoting around a pin 117. As such, the brake lever 118 pushes the strut 119 to the right in FIG. 14 so as to rotate the pivot lever 116 in a counterclockwise direction pivoting around the pin 115.

Such rotation of the pivot lever 116 pushes the strut 120 to the left in FIG. 14 so as to move the brake shoe 112 outwardly pivoting around the abutment point with the anchor 114 as shown in the same figure.

A reaction force generated during the above-operation acts as α to the right in FIG. 14 via the pin 115, which pushes the brake shoe 111 in the same direction. An upper shoe return spring, not shown in the figures, is stretched between the brake shoes 111, 112 adjacent to the cylinder device 113 while a lower shoe return spring, not shown, is stretched between the brake shoes 111, 112 adjacent to the anchor 114, wherein a moment around the pin 115 when combining the effects of a spring force of the lower shoe return spring and a distance from the pin 115 to the lower shoe return spring is larger than that of the upper shoe return spring and a distance from the pin 115 to the upper shoe return spring, thereby the above reaction force a acting on the brake shoe 111 via the pin 115 urging to move the brake shoe 111 outward, pivoting at the abutment point with the anchor 114 as shown in FIG. 14. A clearance β is created in an engagement section between the second strut 120 and the brake shoe 111. Both pistons housed in the cylinder device 113 separate apart to follow the brake shoe 111, 112 respectively by a coil spring compressed therebetween.

Due to the rotational movement shown in FIG. 14, the brake shoes 111, 112 frictionally engage with the inner circumferential surface of the brake drum.

Regarding an explanation as to the braking operation when a counterclockwise rotational force γ as shown in FIG. 15 is acted on the brake drum, the brake shoe 111 is trailed by the rotating brake drum from the position in FIG. 14 in order to fill up the clearance β, also as shown in FIG. 14, to collide and contact with the second strut 120. The rotational force of the rotating brake drum is received by the anchor 114 via the strut 120 and the brake shoe 112. When a clockwise rotational force δ as shown in FIG. 16 is acted on the brake drum, the brake shoe 112 is trailed by the rotating brake drum and the second strut 120 shifts from the position in FIG. 14 to the right in order to fill up the clearance β so as to collide and contact with the brake shoe 111. The rotational force of the brake drum is transmitted through the strut 114 and the brake shoe 111 and is received by the anchor 114.

As is evident from the above-description, when either the clockwise or counterclockwise rotational force of the brake drum is received by the anchor 120, the rotational force is transmitted from one of the brake shoes 111, 112 to the anchor 114 via the second strut 120 and the remaining brake shoe 111 or 112, thereby effecting the parking brake application. Therefore, both brake shoes 111, 112 function as leading shoes having self-servo property regardless of the rotational directions of the brake drum, the drum brake device functions as a duo servo type drum brake.

A conventional dual mode drum brake device uses the strut 120 as a member to transfer the rotational force of the brake drum between both brake shoes 111, 112 during the parking brake operation. The strut 120 needs to be extended between both brake shoes 111, 112. Because of the restriction in its layout, the strut 120 is required to be positioned inwardly relative to the cylinder device 113, and a distance between a drum center, indicated as an X in FIG. 13, and the strut 120 becomes shorter, which tends to increase the self-servo property of the brake shoe 111 or 112 at the primary side during the brake drum rotation.

Here, a relational expression between a brake factor BF representing an effectiveness of the parking brake and braking torque may be: (braking torque)=(brake shoe input)×(effective radius of drum)×(BF). For the above-described conventional dual mode drum brake device, as a coefficient of friction μ of a brake lining becomes larger, the rate of increase in the brake shoe factor of the primary brake shoe becomes larger, and therefore, input from the primary brake shoe to the secondary brake shoe quickly increases; the total brake factor BF by adding the brake shoe factor of the secondary brake shoe onto that of the primary brake shoe quickly increases as shown in FIG. 12; and the brake factor BF over-increases within the practical range of the coefficient of friction $\mu$ of the lining. Accordingly, when considering a stronger brake effectiveness during the parking brake operation, the dual mode drum brake device should be designed stronger than the brake device bearing the strength during the service brake operation and a secure mounting strength of the device, thereby causing drawbacks of increasing the weight and cost of the device.

Further, for the conventional dual mode drum brake device, the primary brake shoe in relation to the rotational direction of the brake drum rotates so that the end of the primary brake shoe adjacent to the cylinder device 113, as shown in FIGS. 15 and 16, proceeds into the cylinder device 113 to fill up the clearance $\mu$ as appeared in FIG. 14 during the parking brake operation, and the piston corresponding to or facing that brake shoe end is greatly pushed relative to the amount of the brake shoe movement approaching the other piston. Under this condition, if the parking brake is released while applying the foot brake pedal, a pedal stroke becomes larger for the approached distance of both pistons, thereby causing a problem of disconcerting the driver's feeling for the pedal.

Further, in order to avoid supporting the braking torque of the primary brake shoe during the parking brake operation by a brake cable via the brake lever 118, the brake lever 118 may not be configured to directly push the strut 120, and the parking brake lever 118 needs to be pivoted at the end portion of the brake shoe 112 adjacent to the anchor 114. Therefore, the conventional device may not use the typical structure for a leading-trailing type drum brake device in which the parking brake lever 118 is pivoted at the end portion of the brake shoe 112 adjacent to the cylinder device 113, which reduces the flexibility in its application and causes difficulty in routing and arranging the brake cable because of existing obstacles such as a suspension device.

SUMMARY AND OBJECT OF THE INVENTION

It is an object of this invention to provide a dual mode drum brake device to resolve all of the above problems.

Further, it is an object of this invention to substantiate a dual mode drum brake device with a forward-pull type parking brake lever and a cross-pull type parking brake lever in the same arrangement as a publicly known leading trailing type drum brake, which facilitates the substitutional use of a leading trailing type drum brake. Moreover, it is an object of this invention to substantiate a dual mode drum brake device in which a forward-pull type parking brake lever and a cross-pull type parking brake lever are utilized just like a conventional dual mode drum brake device, which increases flexibility of brake cable arrangement and routing.

It is another object of this invention to provide a dual mode drum brake device with an added value, wherein the joint member coupling both pistons within the cylinder device may have a shoe clearance adjustment function, or the shoe clearance adjustment function may be conducted automatically, and/or the strut may have a parking brake stroke adjustment function, or the parking brake stroke adjustment function may be conducted automatically.

To that end, a dual mode drum brake device of this invention comprises: a pair of brake shoes positioned to face each other and to be frictionally engaged with an inner circumferential surface of a brake drum, each brake shoe has a first brake shoe end and a second brake shoe end respectively, a cylinder device positioned between a pair of the first adjacent brake shoe ends while a fixed anchor positioned between a pair of the second adjacent brake shoe ends; the cylinder device acts during a service brake operation to advance pistons at a pair of cylinder ends so that the pistons spread the brake shoes apart about abutment points between the pair of the second adjacent brake shoe ends and the anchor to frictionally engage with the inner circumferential surface of the brake drum, a pivot lever is pivotally positioned between ends of one brake shoe; the pivot lever moves along a plane surface which makes a right angle to a brake drum rotational axis, an anchor side strut is extended between a first free end of the pivot lever and the second brake shoe end of the other brake shoe while a cylinder side strut is extended between a second free end of the pivot lever and the first brake shoe end of the other brake shoe and positioned inwardly relative to the cylinder device so that an operating force of a parking brake lever is transmitted to the one brake shoe and the other brake shoe both as an outward force in a radial direction of the brake drum, thereby enabling the operating force of the parking brake lever to separate the brake shoes apart, wherein a force transmitting member is extended between the pair of the first adjacent brake shoe ends and positioned outwardly relative to the cylinder side strut; the force transmitting member transmits a rotational force of the brake drum while a parking brake action is engaged from either brake shoe positioned at a primary side relative to the brake drum rotational direction to a remaining brake shoe positioned at a secondary side relative to the brake drum rotational direction, and the force transmitting member is composed of the two pistons and a joint member extended between the pistons of the cylinder device so as to enable the pistons and the joint member to move integrally while the parking brake action is engaged.

Further, the parking brake lever may engage with the other brake shoe at the first brake shoe end, and the parking brake lever engages with an end of the cylinder side strut at the other brake shoe side.

Still further, the parking brake lever may engage with the other brake shoe at the second brake shoe end, and the parking brake lever engages with an end of the anchor side strut at the other brake shoe side.

Still further, the parking brake lever may engage with the first free end of the pivot lever, and the parking brake lever engages with an end of the anchor side strut at one brake shoe side.

Still further, the joint member may be a shoe clearance adjustment device adjusting clearances between the brake shoes and the inner circumferential surface of the brake drum.

Still further, the shoe clearance adjustment device may be an automatic shoe clearance adjustment device responding to an amount of outward movement of the brake shoes and automatically adjusting the clearances.

Still further, at least one of the cylinder side strut and anchor side strut may include a stroke adjustment device adjusting an amount of the stroke of the parking brake lever.

Still further, the stroke adjustment device may be an automatic stroke adjustment device responding to an amount of outward movement of two brake shoes and automatically adjusting the stroke.

Yet, further, the parking brake lever engages with the second free end of the pivot lever, and the parking brake lever engages with an end of the cylinder side strut.

In this invention, a member transmitting the rotational force of the brake drum between both brake shoes during the parking brake operation is positioned at the outermost side of the drum brake device. Therefore, the distance from the member transmitting the rotational force to the drum center becomes longer, and the self-servo property of both brake shoes during the brake drum rotation is set lower than the conventional device, thereby maintaining the lowest minimum required.

Accordingly, unlike the conventional dual mode drum brake device designed to bear the strong parking brake and requiring to secure a mounting strength of the device itself, the parking brake effectiveness as described herein only needs to clear the minimum requirement, thereby realizing a lighter dual mode drum brake device as well as reducing the cost of the device. During the parking brake operation, if one piston is pushed, the other piston follows to keep a constant clearance between the two pistons. Therefore, if the parking brake is released while the foot brake pedal is applied, the pedal stroke does not become larger, which does not give any disconcerting pedal feeling to the driver.

Further, the brake lever may be pivotally supported on either end of the brake shoe, which does not set any restriction in the brake lever arrangement, and a typical structure for a leading trailing type drum brake device may be utilized, thereby increasing an applicability of the device and not requiring any change in the brake cable arrangement as in a conventional drum brake device.

Furthermore, the above coupling member may be a shoe clearance adjustment device adjusting the shoe clearance between both brake shoes and the inner circumferential surface of the brake drum or the shoe clearance adjustment device may be an automatic shoe clearance adjustment device automatically adjusting the shoe clearance in response to the amount of outward movement of the brake shoe, thereby creating an additional value.

Furthermore, a stroke adjustment device adjusting the stroke amount of the brake lever may be employed in one of the first strut or the second strut or the stroke adjustment device may be an automatic stroke adjustment device automatically adjusting the stroke amount of the brake lever in response to the outward movement of the brake shoe, thereby creating an additional value.

BRIEF DESCRIPTION OF THE DRAWINGS

The above and other objects and advantages of the present invention will become readily apparent by reference to the following detailed description when considered in conjunction with the accompanying drawings.

FIG. 12 is a characteristic diagram where the characteristics of variation regarding the brake factor of the dual mode drum brake device as the structure of this invention is compared with the characteristics of variation regarding the brake factor of the dual mode drum brake device as the structure of the conventional dual mode drum brake device;

DETAILED DESCRIPTION OF THE PREFERRED EMBODIMENT

Embodiments of this invention are explained below with reference to the accompanying drawings. FIGS. 1–6 show one embodiment of the dual mode drum brake device, the drum brake device comprises a hydraulic actuator operating during the service brake operation and a mechanical actuator operating during the parking brake operation.

A back plate 1 is a fixing member of the drum brake device fixed on a stationary member of the vehicle, not shown in the figures. The back plate 1 covers an axial opening end of a brake drum, not shown in the figure, rotating together with a wheel. A space is reserved between the brake drum and the back plate 1, in which the later described brake components are positioned; the components are mounted on the back plate 1.

Figure 1:
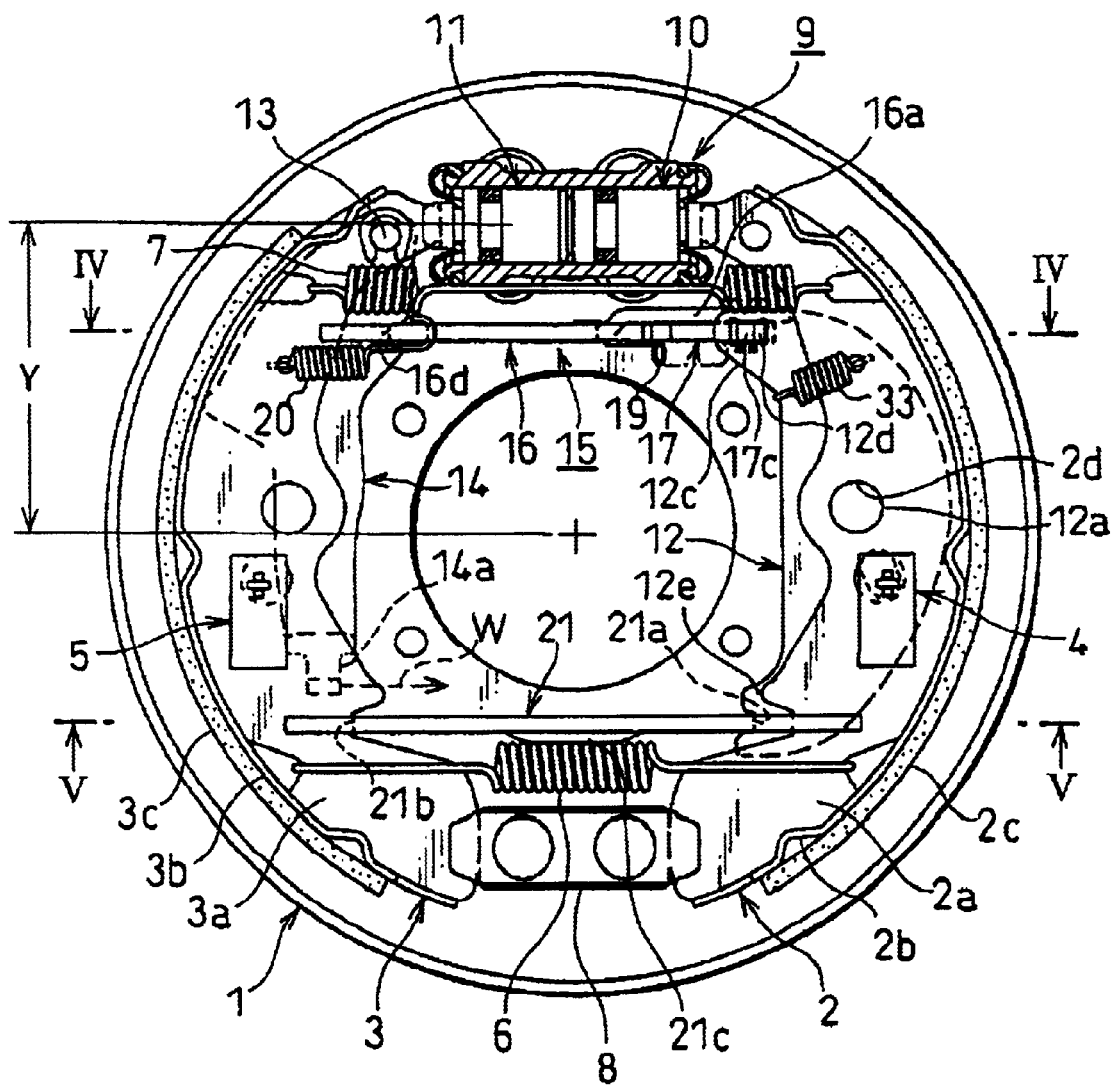
FIG. 1 is a plan view of one embodiment of this invention describing the dual mode drum brake device without a brake drum.
Figure 4:
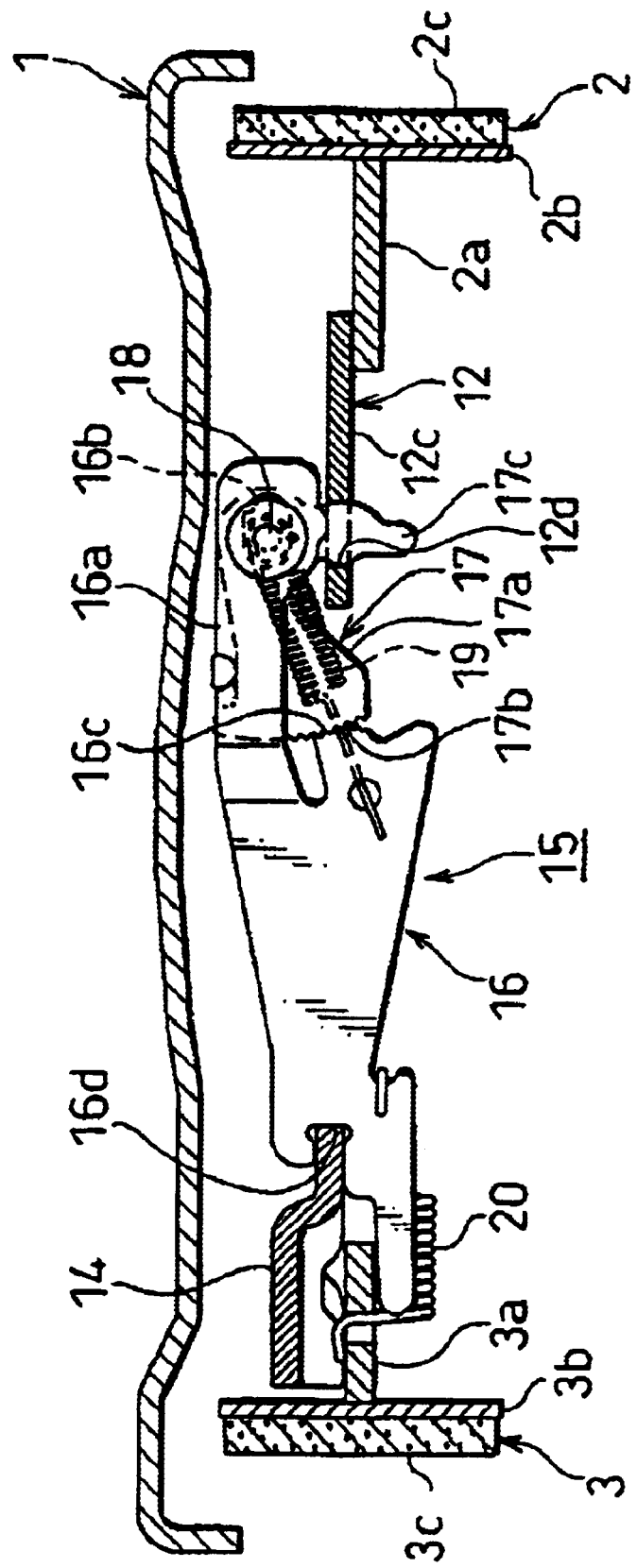
FIG. 4 is a cross-section view taken along line IV—IV of FIG. 1 illustrating the strut at the cylinder device side viewed from the direction of the arrow.
Figure 5:
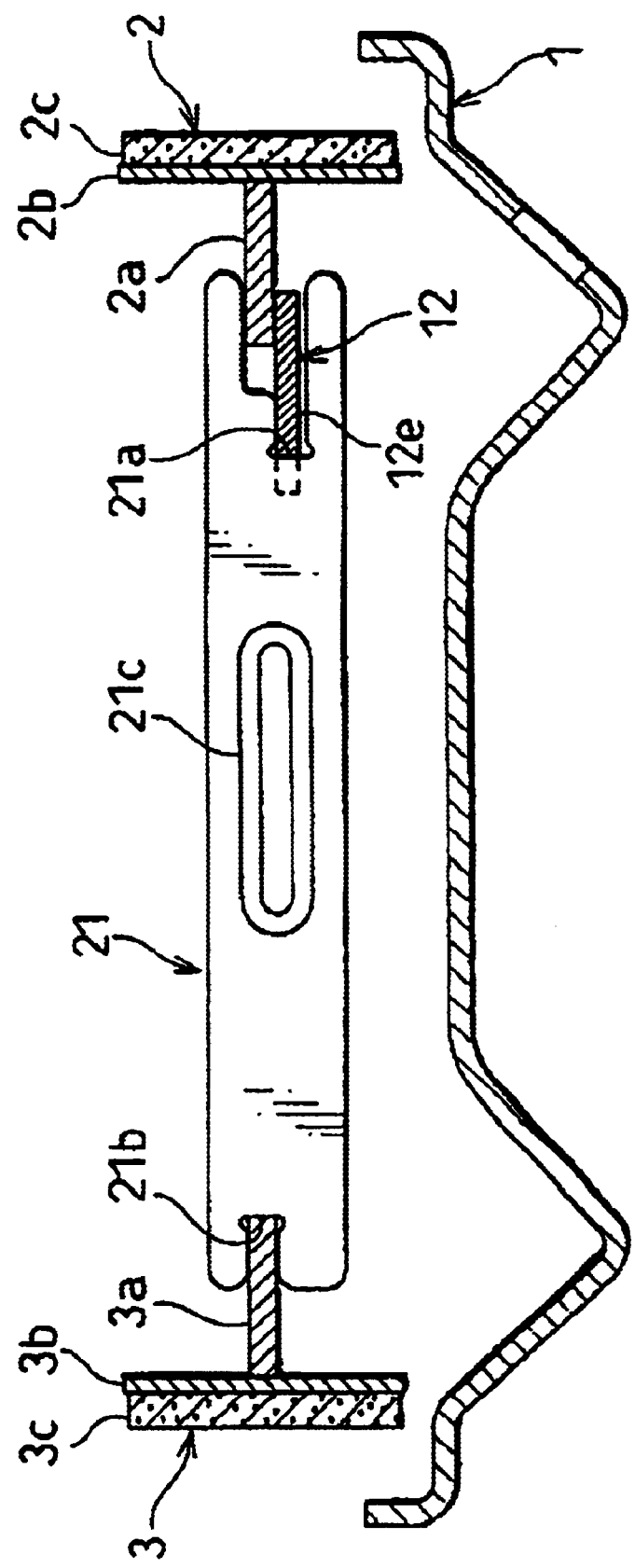
FIG. 5 is a cross-section view taken along line V—V of FIG. 1 illustrating the strut at the anchor side viewed from the direction of the arrow.

As shown in FIGS. 1, 4, and 5, a pair of brake shoes 2, 3 are positioned to face an inner circumferential surface of the brake drum; the brake shoes 2, 3 have webs 2a, 3a, rims 2b, 3b, and linings 2c, 3c. These brake shoes 2, 3 as shown in FIG. 1, are elastically mounted on the back plate 1 by shoe hold devices 4, 5, which are relatively movable within a limited range on the back plate 1 and are energized toward each other by a pair of shoe return springs 6, 7. Adjacent ends of the brake shoes 2, 3 at the lower side of FIG. 1 abut against the fixed anchor 8 securely mounted on the back plate 1 while adjacent ends of the brake shoes 2, 3 at the upper side of FIG. 1 may be pushed by a wheel cylinder 9 (cylinder device) functioning as a hydraulic actuator securely mounted on the back plate 1, thereby enabling the brake shoes 2, 3 to separate apart as described later herein.

Figure 2:
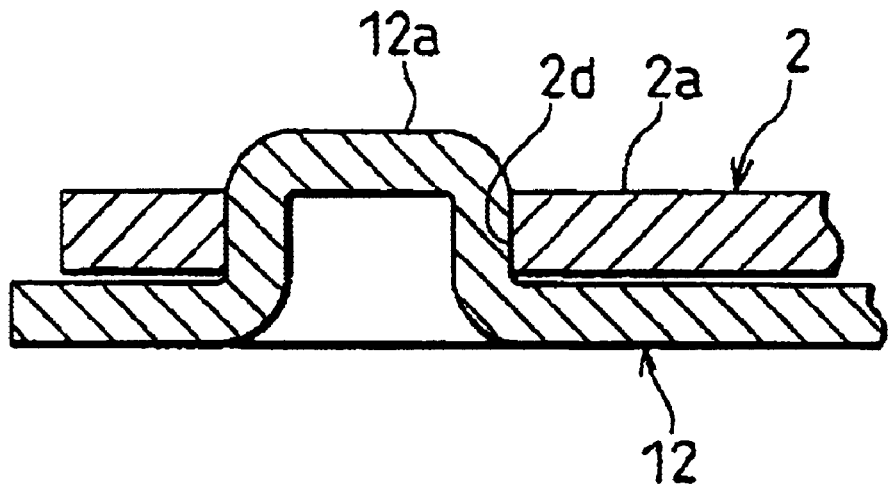
FIG. 2 is a partial cross-section view of the same embodiment illustrating the structure pivoting the pivot lever on one brake shoe.
Figure 3:
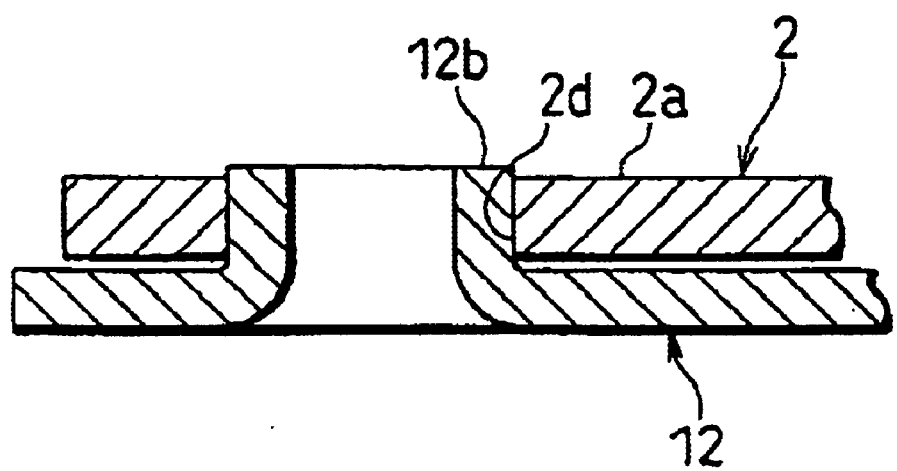
FIG. 3 is a partial cross-section view of deformed embodiment illustrating the pivot structure of the pivot lever relative to the brake shoe.

As shown in FIG. 1, a pivot lever 12 is superposed on the web 2a of one brake shoe 2, and a pin-shaped protuberance 12a is formed between both ends of the pivot lever 12 as shown in FIG. 2. The protuberance 12a of the pivot lever 12 fits in a hole 2d formed on the web 2a between both ends of the brake shoe 2 so that the pivot lever 12 is pivotally supported on the web 2a and is moveable around the protuberance 12a along a plane surface which makes a right angle to the brake drum rotational axis. The protuberance formed on the pivot lever 12 for the pivoting purpose may be a tubular protuberance 12b of FIG. 3 rather than the pin-shaped protuberance 12a of FIG. 2.

As shown in FIG. 1, with respect to the other brake shoe 3, a forward-pull type parking brake lever 14 may be pivotally supported on the web 3a at the end of the brake shoe 3 adjacent to the cylinder device 9, and the parking brake lever 14 as a component of the mechanical actuator is to be rotatable along the plane surface which makes a right angle to the brake drum rotational axis. A free end 14a of the brake lever 14 is connected to the parking brake cable, not shown in the figures, and when actuating the parking brake thus generating the application force pulling the parking brake cable, the free end 14a of the brake lever 14 moves in the direction W, thereby rotating the brake lever 14 around a pin 13 in the corresponding direction.

A strut 15 is extended between a portion adjacent to the pivotally supporting section of the brake lever 14 and a free end 12c of the pivot lever 12 so that the rotational force of the brake lever 14 may be transmitted to the free end 12c of the pivot lever 12 adjacent to the cylinder device 9. The strut 15 is to have a one-shot type stroke adjustment mechanism that automatically adjusts the stroke of the brake lever and has a plate strut body 16 and a bell crank lever 17 as shown in FIG. 4.

An intermediate portion of the bell crank lever 17 is pivotally supported in an elongated hole 16b formed on an offset arm portion 16a of the plate strut body 16 in the vicinity of the brake shoe 2 by a pin 18, and the bell crank lever 17 is forced toward the left in FIG. 4 by a spring 19 stretched between the pin 18 and the plate strut body 16 in order to engage teeth 17b formed on the top of one arm portion 17a of the bell crank lever 17 with teeth 16c of the strut body 16. The other arm portion 17c having a cam surface of the bell crank lever 17 freely fits in a piercing hole 12d formed on the free end 12c of the pivot lever 12. A notched groove 16d is formed on an end of the plate strut body 16 in the vicinity of the brake shoe 3, with which a portion adjacent to the pivot section of the brake lever 14 is engaged, and the engagement is maintained by a spring 20 stretched between the plate strut body 16 and the brake shoe 3.

A plate strut 21 is extended, as shown in FIG. 5, between a free end 12e of the pivot lever 12 adjacent to the anchor 8 and the end of the brake shoe 3; one end of the strut 21 has a notched groove 21a to be engaged with the free end 12e of the pivot lever 12 while the other end of the strut 21 has a notched groove 21b to be engaged with the web 3a of the brake shoe 3. A spring 33 is stretched between the brake shoe 2 and the pivot lever 12 energizing the pivot lever 12 to rotate in the clockwise direction in FIG. 1 so as to maintain the engagement between the free end 12e of the pivot lever 12 and the notched groove 21a. A protrusion 21c is formed between the two ends of the strut 21 contacting a shoe return spring 6 to prevent its vibration.

Figure 6:
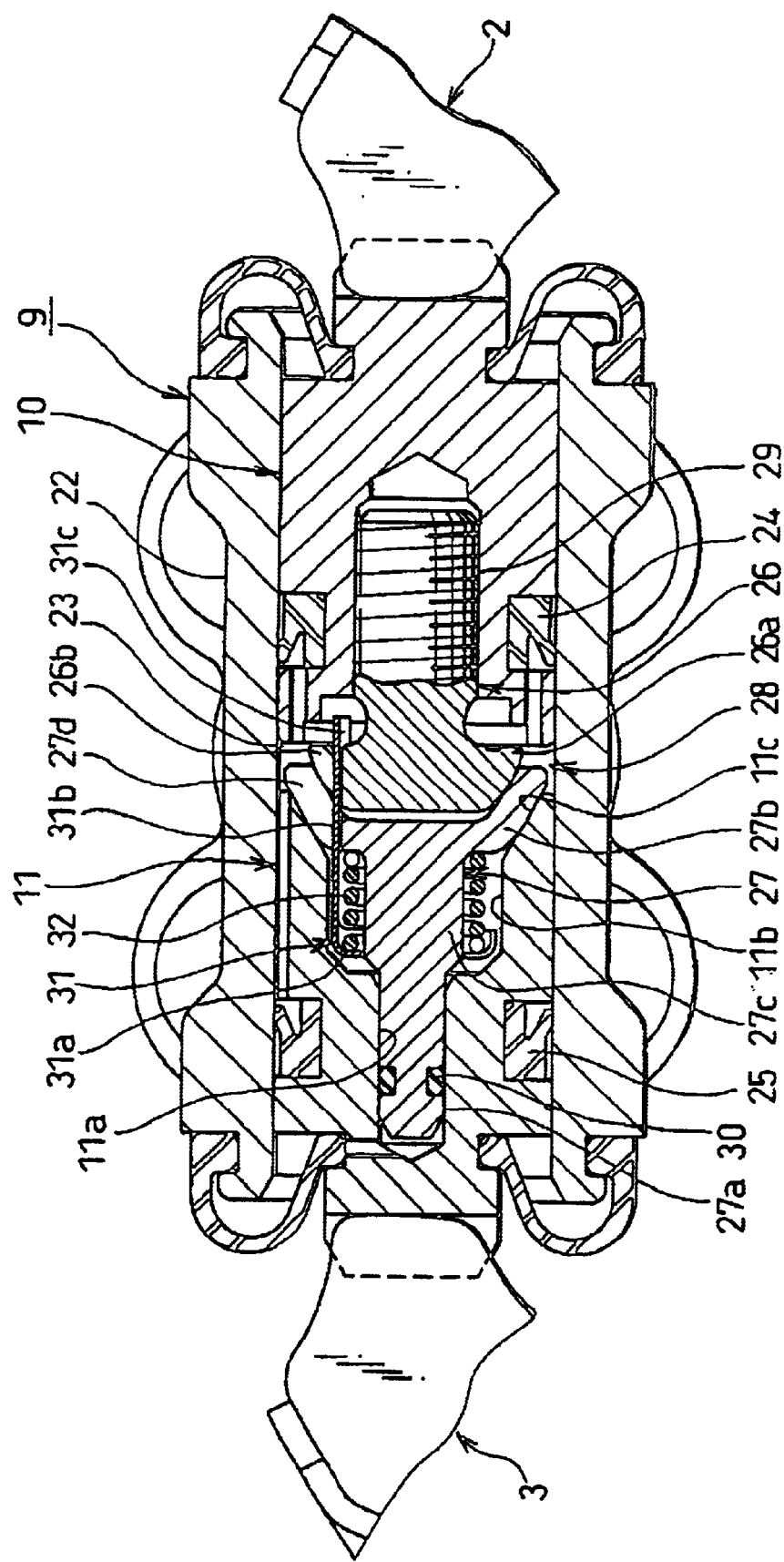
FIG. 6 is a cross-section view of an internal structure of the cylinder device in FIG. 1.

As shown in FIG. 6, the cylinder device 9 includes an automatic shoe clearance adjustment mechanism to automatically adjust a shoe clearance between the brake shoes 2, 3 and the inner circumferential surface of the brake drum, wherein pistons 10, 11 are slidably housed in a cylinder body 22, a brake fluid pressured chamber 23 is partitioned between the pistons 10, 11, and piston cups 24, 25 are positioned between the pistons 10, 11 and a cylinder bore of the cylinder body 22. A joint member of this invention includes an adjustment bolt 26 and a clutch piston 27, wherein a shoe clearance adjustment unit 28 mainly is comprised of an adjustment bolt 26 and a clutch piston 27, positioned between the two pistons 10, 11.

The adjustment bolt 26 is designed to screw into a rear side portion of the piston 10 via a reversible male screw 29 of a multiple thread screw type and to have a conical end flanged head 26a projecting from the rear end surface of the piston 10. The clutch piston 27 is formed in a three-stage shape having a small diameter stem 27a, a conical portion 27b and an intermediate stem portion 27c. A center of the piston 11 is divided into a small diameter blind hole 11a, a medium diameter hole 11b and a conical clutch surface 11c providing an open rear end of the piston 11, also making a three-stage shape corresponding to the three-stage shape of the clutch piston 27.

The small diameter stem 27a of the clutch piston 27 slidably fits into the small diameter hole 11a of the piston 11, and a sealing ring 30 is inserted therebetween. A clearance is reserved between the intermediate stem portion 27c formed between the two ends of the clutch piston 27 and the medium diameter hole 11b of the piston 11, and a spring retainer 31 is inserted therein. The spring retainer 31 comprises a cup-like bottom portion 31a and plural legs 31b extending in its opening, and legs 31b are extended into a split groove 26b formed at the conical end flanged head of the adjustment bolt 26 and a split groove 27d formed at the conical portion 27b of the clutch piston 27, preventing the relative rotation between the adjustment bolt 26 and the clutch piston 27.

A spring 32 is compressed between the cup-like bottom portion 31a of the spring retainer 31 and the conical portion 27b of the clutch piston 27. A movement of the spring retainer 31 to the left due to the spring force of the spring 32 is restricted by an engagement between an interior projection 31c at the top of the leg 31b and the conical end flanged head 26a of the adjustment bolt 26. The conical end flanged head 26a of the adjustment bolt 26 is abutted against the conical portion 27b of the clutch piston 27. As such, the clutch piston 27 may be incapable of making a relative rotation but is axially resiliently integrated with the adjustment bolt 26, and the shoe clearance adjustment unit 28 may be used as a single member.

Operation of the dual mode drum brake device according to the embodiment having the above structure is described as follow.

When a service brake operates upon pressing a foot brake pedal, a fluid is supplied into the brake fluid pressure chamber 23 of the cylinder device 9 to advance two pistons housed therein at both sides of the cylinder body 22. The pistons 10, 11 push the corresponding ends of both brake shoes 2, 3 to rotate around the abutment point with the anchor 8 and separate the brake shoes 2, 3 against the spring force of the shoe return springs 6, 7, and the predetermined braking operation is conducted by making a frictional engagement between both brake shoes 2, 3 and the inner circumferential surface of the brake drum. During the service brake operation, the dual mode drum brake device operates as a stable leading-trailing type drum brake with the braking factor BF as shown in FIG. 12, where one of the brake shoes 2, 3 becomes a leading shoe in relation to the rotational direction of the brake drum, thereby characterizing a self-servo property, and the remaining of the two brake shoes becomes a trailing shoe in relation to the rotational direction of the brake drum without a self-servo property.

If the amount of rotation regarding the brake shoes 2, 3 during the brake operation is small on the ground that wearing of the linings 2c, 3c does not occur, the amount of separation of the pistons 10, 11 is equal to or smaller than an axial clearance of the reversible male screw 29, and the piston 10 does not move with the adjustment bolt 26. Hydraulic pressure in the brake fluid pressure chamber 23 acts on the small diameter stem 27a of the clutch piston 27 to energize the clutch piston 27 to the left in FIG. 6. Therefore, the clutch piston 27 moves with the piston 11 keeping the contact between the conical portion 27b and a clutch surface 11c, and the adjustment bolt 26 also moves theretogether. Accordingly, the adjustment bolt 26 does not make a rotation relative to the piston 10 to feed out, and no unnecessary shoe clearance adjustment by the reversible male screw 29 is conducted.

If the amount of rotation regarding the brake shoes 2, 3 during the service brake operation is large on the ground that wearing of the linings 2c, 3c occurs, the amount of separation of the pistons 10, 11 is larger than an axial clearance of the reversible male screw 29, and the piston 10 with no clearance tries to move with the adjustment bolt 26. An operation force acting on the small diameter stem 27a of the clutch piston 27 becomes stronger than the spring force of the spring 32, the clutch piston 27 integrally formed with the adjustment bolt 26 and the legs 31b of the spring retainer 31 moves with the piston 11, and the conical surface of the conical portion 27b of the clutch piston 27 slides on the clutch surface 11c and becomes incapable of preventing the rotation of the adjustment bolt 26.

Hydraulic pressure in the brake fluid pressured chamber 23 acts on the small diameter stem 27a of the clutch piston 27 to energize the clutch piston 27 to the left in FIG. 6. Therefore, the adjustment bolt 26 receives a thrust force in the outward stroke direction of the piston 10, and the spring force of the reversible male screw makes the adjustment bolt 26 and the clutch piston 27 rotate together to proceed from the piston 10, thereby ending the automatic shoe clearance adjustment.

Upon the extinction of the hydraulic pressure after releasing the brake pedal, both pistons 10, 11 receive the spring force from the shoe return springs 6, 7 via the brake shoes 2, 3 as shown in FIG. 1 and returns to the closest position corresponding to the amount of initial shoe clearance to separate the brake shoes 2, 3 from the inner circumferential surface of the brake drum, thereby releasing the service brake. Accordingly, the shoe clearance is automatically adjusted according to the amount of the axial clearance of the reversible male screw 29.

If over-hydraulic pressure deforming the drum is generated in the process of stroking the pistons 10, 11, the hydraulic pressure acts on the small diameter stem 27a of the clutch piston 27 and the operation force energizing the clutch piston 27 to the left in FIG. 6 becomes larger than the spring force of the spring 32; therefore, the spring 32 is deflected to separate clutch surfaces between the adjustment bolt 26 and the clutch piston 27. Accordingly, when the amount of separation between the brake shoes 2, 3 due to the drum deformation occurs, an erroneous over-adjustment of the shoe clearance may be prevented.

A stroke adjustment function of the brake lever 14 is explained next.

If wearing of the linings 2c, 3c is small and the amount of rotation of both brake shoes 2, 3 is smaller than the predetermined value during the service brake operation, the strut body 16 and the bell crank lever 17 maintains the relative position of FIG. 4 and does not change the effective length of the strut 15.

If wearing of the linings 2c, 3c proceeds and the amount of rotation of both brake shoes 2, 3 due to the cylinder device 9 becomes the predetermined value or more, the inner surface of the piercing hole 12d formed on the pivot lever 12 pulls an arm portion 17c of the bell crank lever 17 to the right in FIG. 4 via the spring 33, or the brake shoe 3 pulls the strut body 16 and the brake lever 14 to the left in FIG. 4 via the spring 20. Since a pin 18 pivoting the bell crank lever 17 on the strut body 16 is being pulled by the spring 19, the pulling of the pin 18 moves the strut body 16 and the arm portion 17c to separate each other. When this relative movement exceeds the engagement height between the teeth 16c of the strut 16 and the teeth 1 7b of the bell crank lever 17, the teeth engagement deviates to rotate the bell crank lever 17 in a counterclockwise direction around the pin 18 due to the force pulling the arm portion 17c in the right direction in FIG. 4 and an act of the spring 19, and a new tooth 17b of the bell crank lever 17 engage with the teeth 16c of the strut body 16 when releasing the brake.

As such, the effective length of the strut 15 increases to the degree that the amount of rotation of both brake shoes 2, 3 exceeds the predetermined value, and the amount of stroke of the brake lever 14 is automatically maintained lower than the predetermined value even though the wearing of the linings 2c, 3c proceeds.

Operation of the parking brake is explained next, wherein an application force of the parking brake generated by a driver is transmitted to the free end 14a of the brake lever 14 as an arrow W in FIG. 1. As such, the brake lever 14 rotates in a counterclockwise direction in FIG. 1 around the pin 13 relative to the brake shoe 3. At this time, the brake lever 14, moves the end of the brake shoe 3 adjacent to the cylinder device 9 via the pin 13 to the left in FIG. 1 rotates to open the brake shoe 3 around the abutment point with the anchor 8, while pushes the strut 15 to the right in FIG. 1 to rotate the pivot lever 12 in a clockwise direction around the pin-shaped protuberance 12a.

The free end 12e of the pivot lever 12 adjacent to the anchor 8 sticks to hit against the brake shoe 3 via the strut 21. Therefore, the above rotation is restricted, and the pivot lever pushes the protuberance 12a to the right in FIG. 1 via the brake shoe 2. Here, the shoe return springs 6, 7, the same as in the above-described conventional device, have a moment acting on the brake shoe 2 around the protuberance 12a at the side of the shoe return spring 6 adjacent to the anchor 8 is to be larger than a moment at the side of shoe return spring 7 adjacent to the cylinder device 9, and when the pivot lever 12 pushes the brake shoe 2 to the right in FIG. 1, the brake shoe 2 rotates to open around the abutment point with the anchor 8. Accordingly, both brake shoes 2, 3 during the parking brake operation rotate to be separated apart around the abutment point with the anchor 8 just like as during the service brake operation, thereby making the frictional engagement with the inner circumferential surface of the brake drum.

Under this condition, when the brake drum generates a clockwise rotational force in FIG. 1, the brake shoe 3, i.e., a primary brake shoe, at the primary side of the brake drum rotational direction, is carried and rotates with the brake drum, and the rotational force of the brake drum is transmitted to the brake shoe 2, a secondary brake shoe, via the piston 11 of the cylinder device 9, the clutch piston 27 and the adjustment bolt 26 as the joint member, and the piston 10 ultimately receiving the rotational force of the brake drum at the anchor 8. Accordingly, both brake shoes 2, 3 together function as leading shoes relative to brake drum rotational direction.

On the other hand, when the brake drum generates a counterclockwise rotational force in FIG. 1, the brake shoe 2, i.e., a primary brake shoe, at the primary side of the brake drum rotational direction, is carried and rotates with the brake drum, and the rotational force of the brake drum is transmitted to the brake shoe 3, a secondary brake shoe, via the piston 10 of the cylinder device, the clutch piston 26 and the adjustment bolt 27 as the joint member, and the piston 11 ultimately receiving the rotational force of the brake drum at the anchor 8. Here again, both brake shoes 2, 3 together function as leading shoes relative to brake drum rotational direction.

Accordingly, the dual mode drum brake device, during the parking brake operation, operates as a duo servo type brake device regardless of the direction of the rotational force generated by the brake drum. Upon releasing the parking brake application force W in FIG. 1, the parking brake mechanism receives the spring force from the shoe return springs 6, 7 via the brake shoes 2, 3 and returns to an initial position to separate the brake shoes 2, 3 apart from the inner circumferential surface of the brake drum, thereby releasing the parking brake.

In this embodiment, both brake shoes 2, 3 are designed to function as leading shoes during the parking brake operation and employment of the structure shown in FIG. 1, both pistons 10, 11 of the cylinder device 9 are joined to each other by the shoe clearance adjustment unit 28 wherein the unit is designed to be a member transmitting the rotational force of the brake drum to both brake shoes 2, 3 during the parking brake operation. Therefore, a distance Y as shown in FIG. 1 between the member transmitting the rotational force of the brake drum, i.e., the pistons 10, 11, and a brake drum center becomes longer, the self-servo property of the brake shoe at the primary side during the brake drum rotation may be smaller than the conventional (prior) art and also an input to the secondary brake shoe may be reduced, thereby minimizing the brake factor BF within the practical range as shown in FIG. 12.

Accordingly, conventional dual mode drum brake device itself is designed so as to bear the strong parking brake and required to secure a mounting strength of the device itself. However, in the embodiment of this invention, the parking brake effectiveness only needs to clear the minimum requirement, thereby realizing a lighter dual mode drum brake device as well as reducing the cost of the device ultimately solving the above-mentioned problems of the conventional device.

Further, in this embodiment, if the primary brake shoe of both brake shoes 2, 3 at the primary side of the rotational direction of the brake drum, with its end adjacent to the cylinder device 9 proceeds into the cylinder device 9 during the parking brake operation, the end of the primary shoe pushes one of the pistons 10, 11 corresponding to the same, and the remaining piston follows to maintain a clearance between the two pistons 10, 11. Therefore, if the parking brake is released from the parking brake state while applying the foot brake pedal, a pedal stroke only needs to be a small amount, thereby improving the pedal action feeling for the driver.

Further, in this embodiment, when the brake lever 14 is pivotally supported on the brake shoe 3 at its side without the pivot lever 12 pivotally supported, even if the brake lever 14 is pivotally supported at the end of the brake shoe 3 adjacent to the cylinder device 9 and the end of the strut 15 corresponding to the brake lever 14 adjacent to the pivot section is engaged with the brake lever 14, if the brake lever 14 is pushed back for the shoe clearance, the pistons 10, 11 become the member transmitting the rotational force of the brake drum, a structure of the general leading trailing type drum brake device, where the brake lever 14 is typically pivoted at the end of the brake shoe adjacent to the cylinder device 9, may be utilized which increases the flexibility and there is no need to employ a different brake cable arrangement from the conventional drum brake device. Especially, a dual mode drum brake device facilitates the use of either a forward-pull type brake lever or a cross-pull type brake lever in a leading trailing type drum brake device without rearranging the brake cable.

Figure 7:
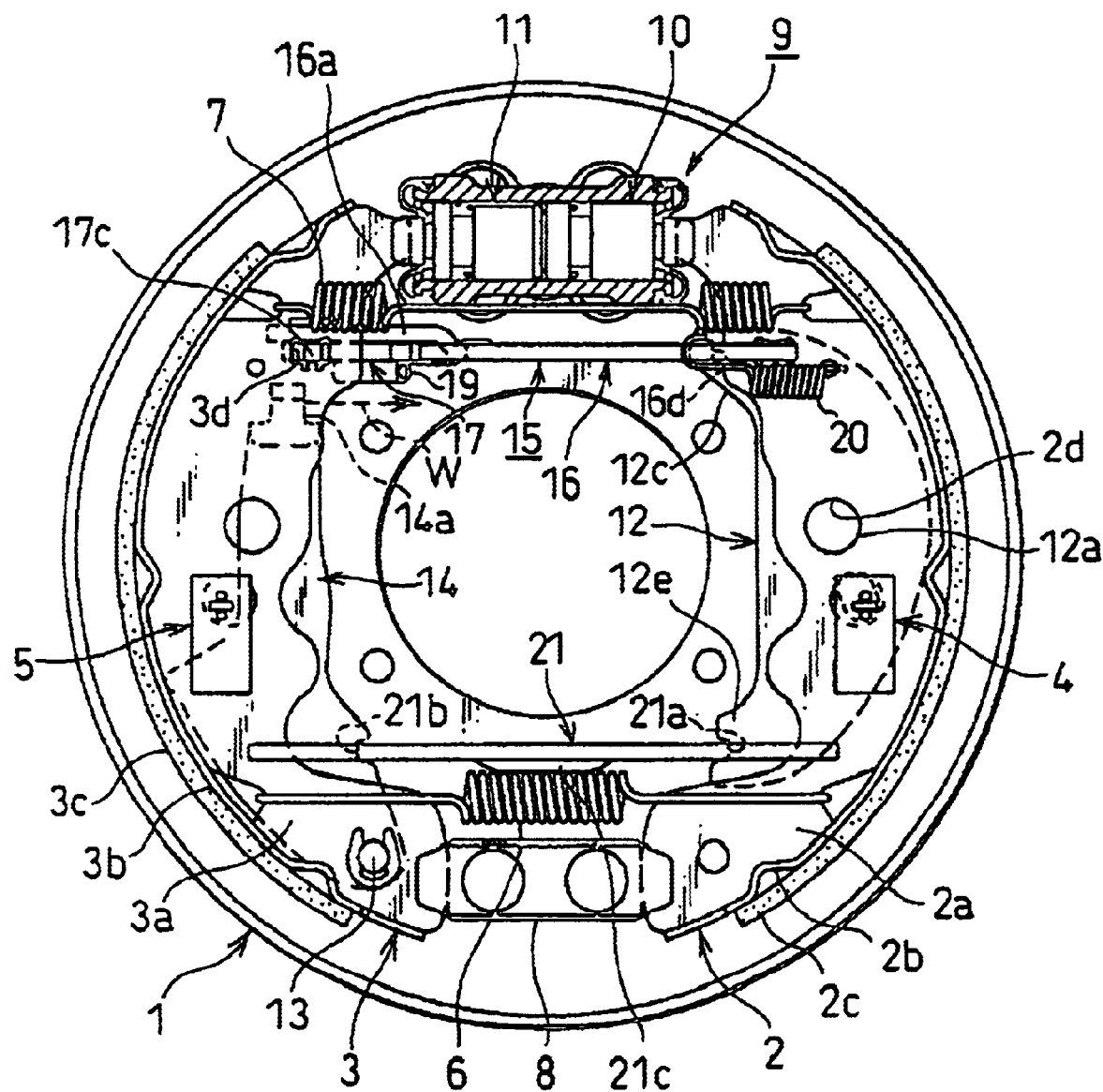
FIG. 7 is a plan view of another embodiment of this invention illustrating the dual mode drum brake device without a brake drum.

FIG. 7 shows a dual mode drum brake device according to another embodiment of this invention. A pivoting section where the forward-pull type parking brake lever 14 pivotally supported on the web 3a of the brake shoe 3 with the pin 13 is to be the end of the brake shoe 3 at the side adjacent to the anchor 8, and the strut 15 has the same structure as described in FIG. 4 but positioned with mirror symmetry relative to FIG. 1.

Accordingly, the notched groove 21b of the strut 21 is engaged with the pivotally supporting section (i.e., around the pin 13) on the brake lever 14, and the strut 21 is extended between the brake lever 14 and the free end 12e of the pivot lever 12. Further, the arm portion 17c of the bell crank lever 17 as a section of the strut 15 is freely fit into the piercing hole 3d formed on the web 3a of the brake shoe 3 while the free end 12c of the pivot lever 12 is engaged with the notched groove 16d of the strut body 16 as another section of the strut 15, and the strut 15 is extended between the end portion of the brake shoe 3 and the free end 12c of the pivot lever 12 both adjacent to the cylinder device 9. Furthermore, the spring 20 is stretched between the strut body 16 and the brake shoe 2 in order to energize the strut 15 toward the brake shoe 2 so as to maintain the engagement between the notched groove 16d and the free end 12c of the pivot lever 12

The dual mode drum brake device having the above structure operates the same as the above-described embodiment, functioning as a leading trailing type brake during the service brake operation while functioning as a duo servo type brake during the parking brake operation, thereby attaining the same effect as described during the parking brake operation. However, here the brake lever 14 is pivotally supported at the end portion of the brake shoe 3 adjacent to the anchor 8 contrary to ordinary forward-pull type brake lever and the brake lever 14 is engaged with the corresponding end of the strut 21 adjacent to the pivotally supporting section; therefore, a variety of arrangements are possible for the forward-pull type brake lever and the brake cable, which increases the flexibility of the embodiment.

The above-described embodiment illustrates the forward-pull type brake lever where the parking brake lever 14 is pivotally supported at the web 3a of the brake shoe 3 so as to move along the plane surface which makes a right angle to the brake drum rotational axis; however, according to the concept of this invention as later explained, the brake lever of this invention is applicable to a cross-pull type parking brake lever rotating within a plane parallel to the brake drum rotational axis.

Figure 8:
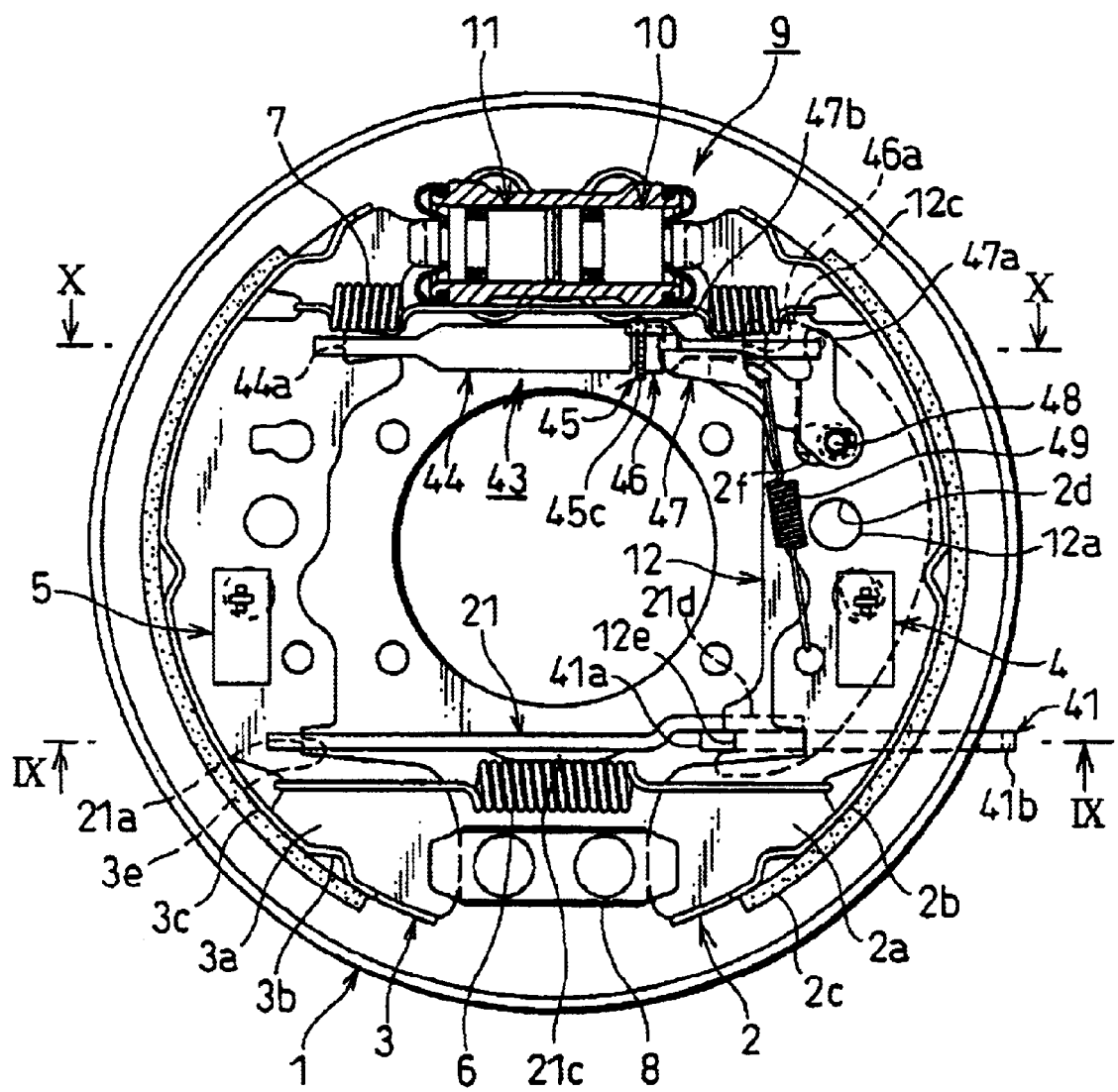
FIG. 8 is a plan view of further another embodiment of this invention illustrating the dual mode drum brake device without a brake drum.
Figure 9:
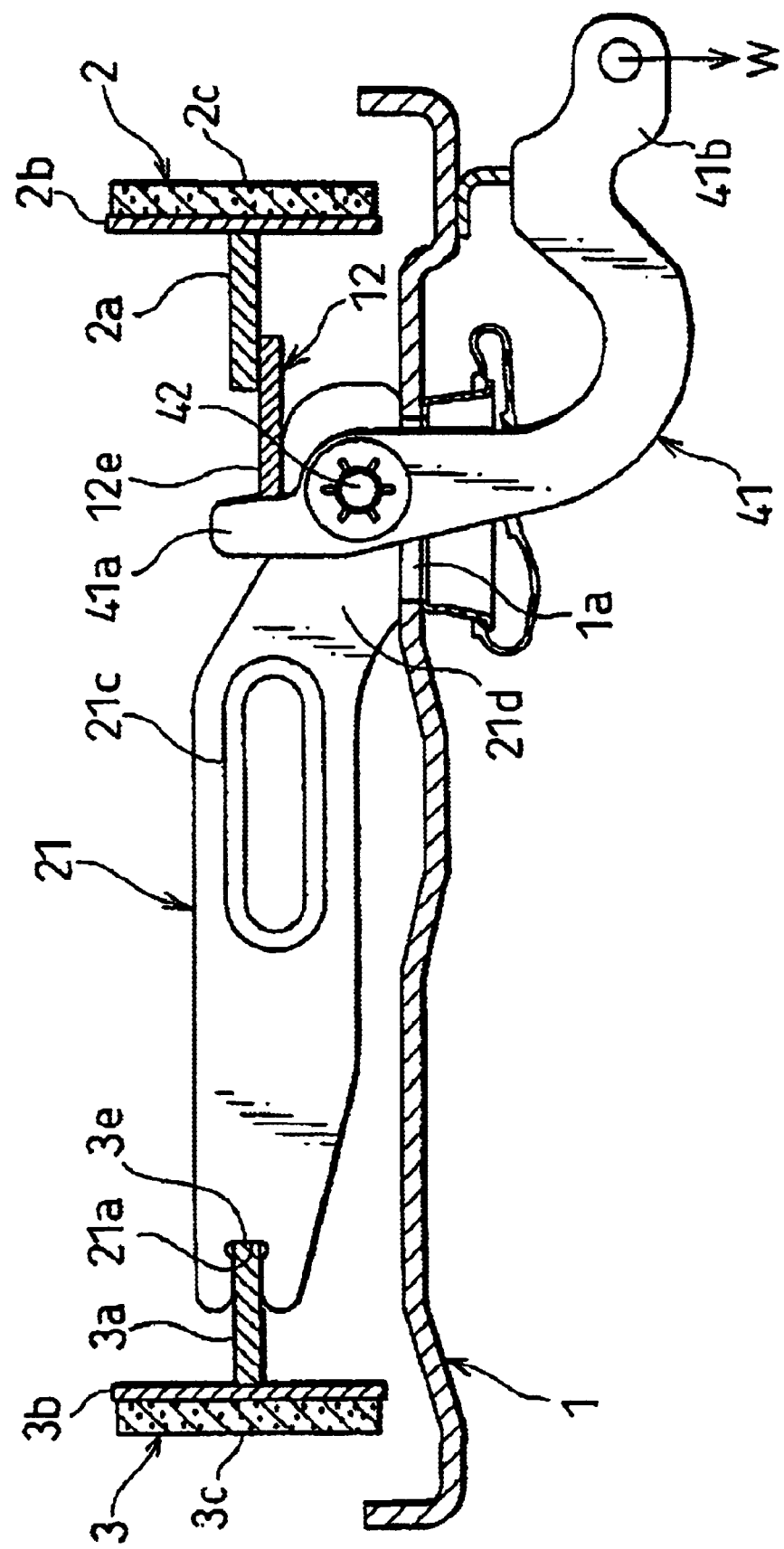
FIG. 9 is a cross-section view taken along line IX—IX of FIG. 8 illustrating the strut and the parking brake lever at the anchor side viewed from the direction of the arrow.
Figure 10:
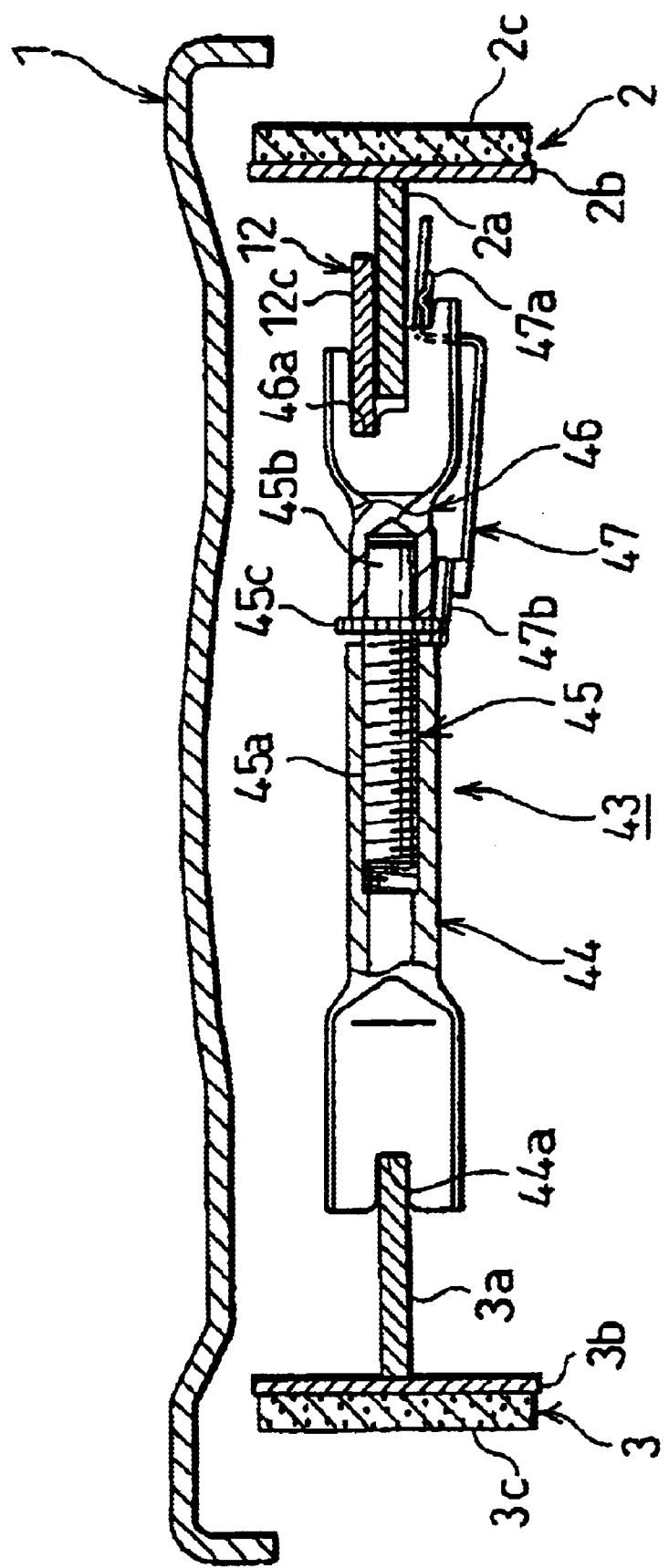
FIG. 10 is a cross-section view taken along line X—X of FIG. 8 illustrating the strut at the cylinder device side viewed from the direction of the arrow.

FIGS. 8–10 show an embodiment of the cross-pull type parking brake lever 41 engaged with the free end 12e of the pivot lever 12 adjacent to the anchor 8, wherein the brake lever 41 is pivotally supported at the end portion 21d of the strut 21 at the far side of the brake shoe 3 by a pin 42, and an actuating end 41a of the brake lever 41 is engaged with the free end 12e of the pivot lever 12. Further, the end portion 21d of the strut 21 is mounted on the inner surface of the back plate 1 only and is slidable along that surface. The end of the strut 21 away from the brake shoe 2 at its notched groove 21a is engaged with the notched groove 3e formed on the web 3a of the brake shoe 3.

An operating end 41b of the brake lever 41 is projected out through the opening 1a of the back plate 1, and the parking brake cable not shown in the figures is connected with the operation end 41b making it possible to input the parking brake operation force W therethrough.

As shown in FIG. 8, the strut 43, having an incremental type stroke adjustment mechanism automatically adjusting the stroke of the brake lever 41, is extended between the free end 12c of the pivot lever 12 and the end portion of the brake shoe 3 both adjacent to the cylinder device 9.

The strut 43 as shown in FIG. 10 has a tubular member 44, an adjustment bolt 45, and a socket member 46, and is structured the same as the conventional art.

The tubular member 44 has a notched groove 44a formed at one end thereon. The notched groove 44a engages with the web 3a of the brake shoe 3 for preventing the rotation of the tubular member 44.

One end 45a of the adjustment bolt 45 is screwed into the other end of the tubular member 44 while the other end 45b of the adjustment bolt 45 is rotatably fit in one end of the socket member 46, and a toothed ring 45c is integrally formed between both ends of the adjustment bolt 45.

The socket member 46 has a notched groove 46a formed at the other end thereon. The notched groove 46a engages with the free end 12c of the pivot lever 12 for preventing the rotation of the socket member 46.

An adjustment lever 47 automatically adjusting the shoe clearance has yoke-like arms 47a, 47b. A pivot end of the adjustment lever is pivotally supported by a pin 48 raised on the pivot lever 12 as shown in FIG. 8, and the pin 48 movable laterally penetrates through the piercing hole 2f on the web 2a of the brake shoe 2.

A spring 49 is stretched between the arm 47b of the adjustment lever 47 and the brake shoe 2 to energize the adjustment lever 47 to rotate in a counterclockwise direction in FIG. 8, and the resultant rotation of the adjustment lever 47 is restricted by abutting the arm 47a on the socket member 46, thereby rotatably engaging the arm 47b of the adjustment lever 47 with the toothed ring 45c of the adjustment bolt 45.

Furthermore, the spring 49 gives a clockwise rotational force pivoting at the protuberance 12a in FIG. 8 to the pivot lever 12, energizing the brake lever 41 and the strut 21 to the left.

For the explanation of the operation of the dual mode drum brake device in the above described embodiment, the service brake operation conducted by hydraulic operation of the cylinder device 9 is the same as each embodiment described above, thereby functioning as a leading trailing type brake.

For the explanation of the operation of the parking brake, if the parking brake application force generated by the driver is transmitted to the operating end 41b of the brake lever 41 as shown by arrow W in FIG. 9, the brake lever 41 is rotated in a clockwise direction around the pin 42 relative to the strut 21 as shown in FIG. 9. At that time, the brake lever 41 pushes the free end 12e of the pivot lever 12 adjacent to the anchor 8 via the strut 21 by a reaction force while the brake shoe 3 acts as a reaction force receiver. The pivot lever 12 rotates in a counterclockwise direction in FIG. 8 around the protuberance 12a to move the strut 43 to the left in FIG. 8. The movement of the strut 43 pushes the end portion of the brake shoe 3 adjacent to the cylinder device 9 to the left rotating the same outwardly around the abutment point with the anchor 8, thereby making a frictional engagement between the brake shoe 3 and the inner circumferential surface of the brake drum.

From this moment, the strut 43 is not moved as above, and the pivot lever 12 thereafter rotates in a counterclockwise direction in FIG. 8 at the abutment point with the strut 43 as the fulcrum. Accordingly, the pivot lever 12 pushes the brake shoe 2 to the right in FIG. 8 via the protuberance 12a. As stated above, the shoe return springs 6, 7 are configured such that a moment acting on the brake shoe taking the protuberance 12a as a pivot point is designed to be larger on the shoe return spring 6 side adjacent to the anchor 8 than on the shoe return spring 7 side adjacent to the cylinder device 9. Therefore, when the pivot lever 12 as stated above pushes the brake shoe 2 to the right in FIG. 8 via the protuberance 12a, the brake shoe 2 outwardly rotates around the abutment point with the anchor 8 as the fulcrum. Accordingly, both brake shoes 2, 3 during the parking brake operation rotate to be separated apart around the abutment point with the anchor 8 same as during the service brake operation, thereby making the frictional engagement with the inner circumferential surface of the brake drum.

Under this condition, when the brake drum generates a clockwise or a counterclockwise rotational force in FIG. 8, the brake shoe 3 or 2, i.e., a primary brake shoe, is carried and rotates with the brake drum, and the rotational force of the brake drum is transmitted to the remaining brake shoe 2 or 3, a secondary brake shoe, via the pistons 10, 11 and the joint member of the cylinder device 9, thereby ultimately receiving the rotational force of the brake drum at the anchor 8. Accordingly, during the parking brake operation, both brake shoes 2, 3 together function as brake shoes having self-servo property, thereby operating as a duo servo type brake.

Upon releasing the parking brake application force W in FIG. 9, the parking brake mechanism receives the spring force generated by the shoe return springs 6, 7 via the brake shoes 2, 3 and returns to an initial position as shown in FIG. 8 separating the brake shoes 2, 3 apart from the inner circumferential surface of the brake drum and releasing the parking brake.

Stroke adjustment function of the brake lever 41 is explained next. If wearing of the linings 2c, 3c progresses and the amount of rotation of both brake shoes 2, 3 caused by the cylinder device 9 is larger than the predetermined value, the amount of movement of the strut body 43 following the brake shoe 3 increases, and the amount of the movement of the pivot lever 12 to the right in FIG. 8 almost together with the brake shoe increases.

The arm 47b of the adjustment lever 47 at that time rotates in a counterclockwise direction in FIG. 8 to the amount of movement to the right in FIG. 8 regarding the pin 48 moving together with the pivot lever 12 and to the amount of movement to the left in FIG. 8 regarding the arm 47a of the adjustment lever 47 following the strut 43. As wearing of the linings 2c, 3c progress, if the arm 47a of the adjustment lever 47 rotates in a counterclockwise direction in FIG. 8 and exceeds the tooth pitch of the toothed ring 45c, the arm 47b of the adjustment lever 47 upon releasing the service brake engages with the next tooth of the toothed ring 45c and rotates the toothed ring 45c (adjustment bolt 45) at the next service brake operation to feed the adjustment bolt 45 out from the tubular member 44.

Accordingly, the effective length of the strut 43 increases and prevents the stroke of the brake lever 41 from becoming larger even if the linings 2c, 3c are worn off.

Therefore, the dual mode drum brake device of the embodiments in this invention operates the same as the above described embodiment, functioning as a leading trailing type brake during the service brake operation while functioning as a duo servo type brake during the parking brake operation, thereby attaining the same effect as described above during the parking brake operation.

Also, objects of this invention may be attained in the way that a forward-pull type parking brake lever 14 in the embodiment in FIGS. 1–6 and a forward-pull type parking brake lever in the embodiment in FIG. 7 as well are similarly replaced with a cross-pull type parking brake lever 41 just like the embodiment in FIGS. 8–10.

Figure 11:
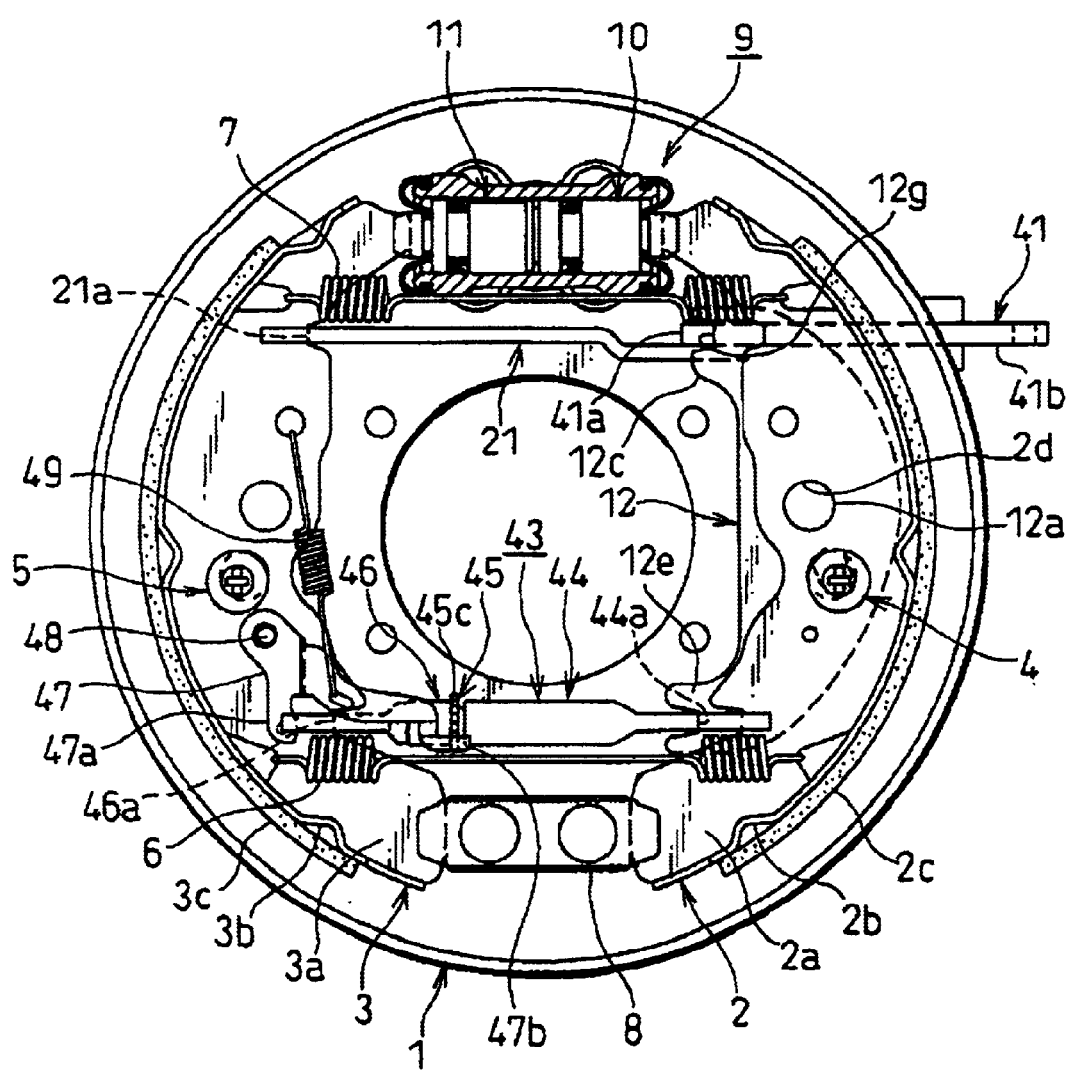
FIG. 11 is a plan view of further more another embodiment of this invention illustrating the dual mode drum brake device without a brake drum.
Figure 13:
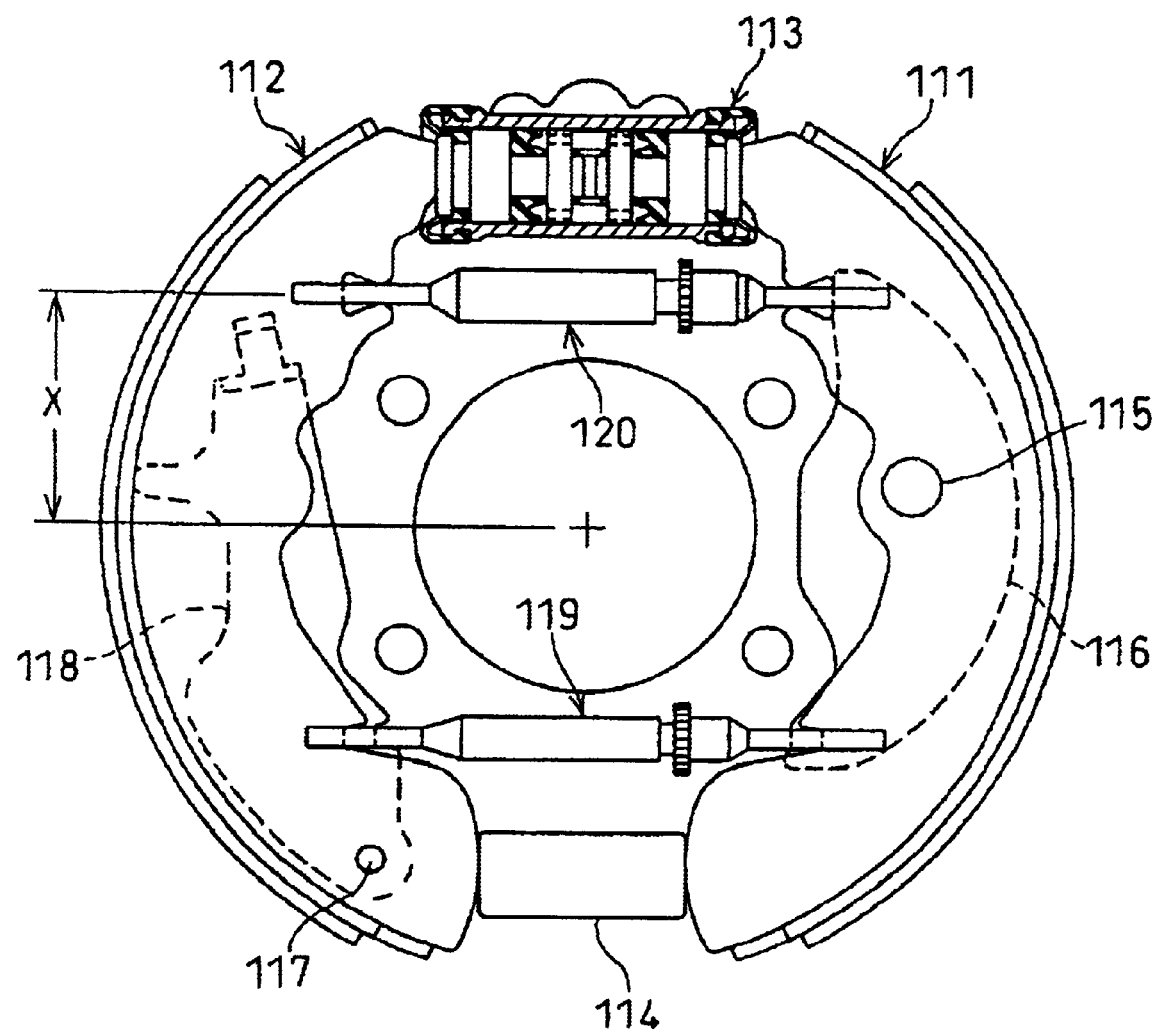
FIG. 13 is a schematic view of a conventional dual mode drum brake device under the condition without operating the brake.
Figure 14:
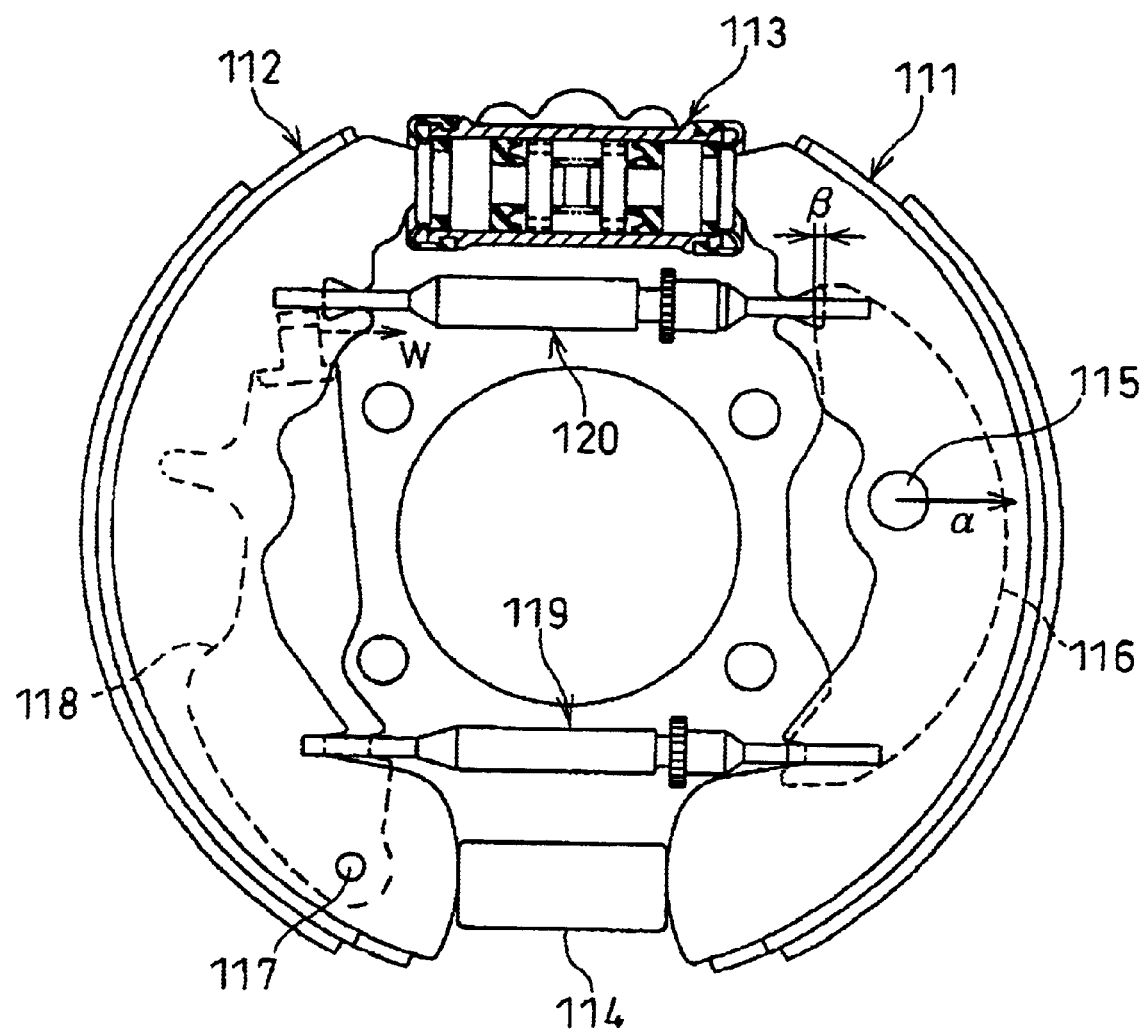
FIG. 14 is a schematic view of conventional dual mode drum brake device under the condition the parking brake operation is being conducted.
Figure 15:
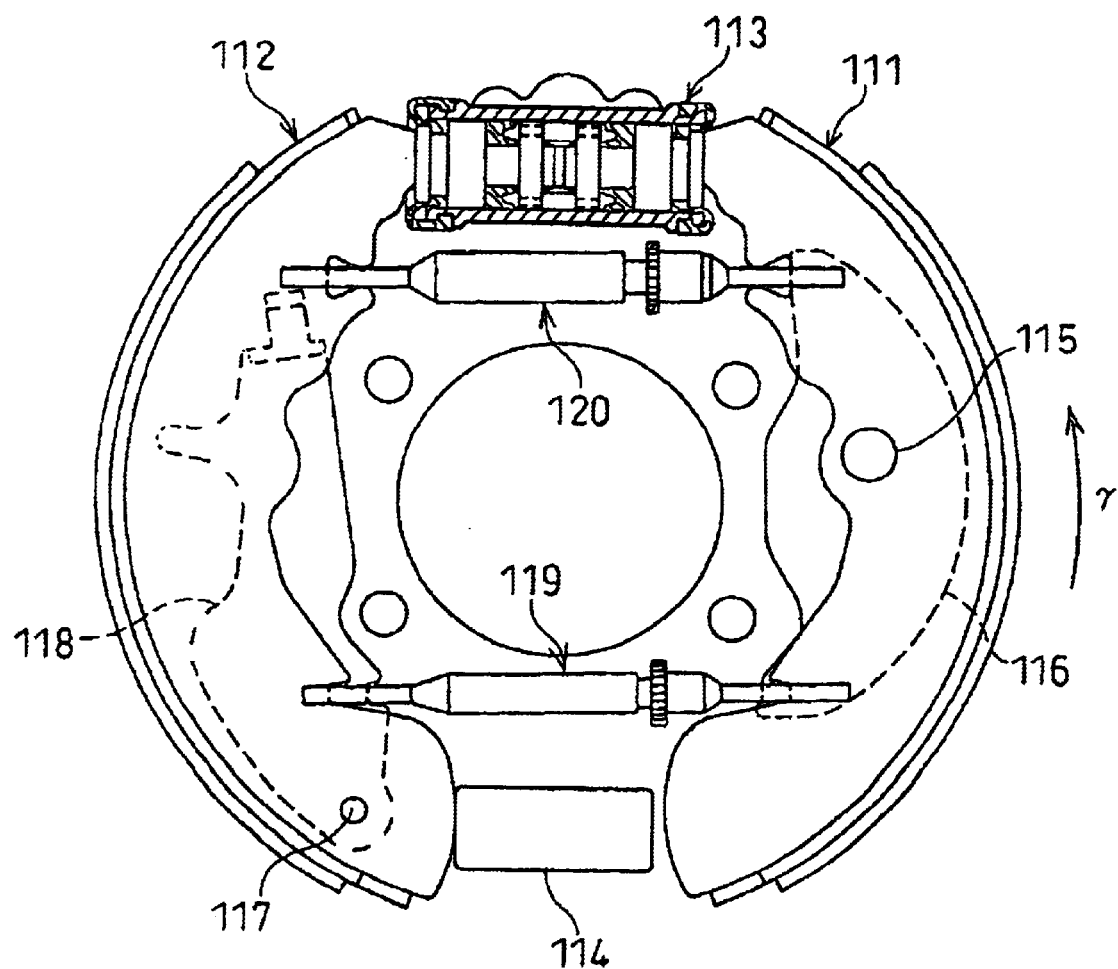
FIG. 15 is a schematic view of a conventional dual mode drum brake device under the condition of receiving a drum rotational force in one direction after the parking brake operation is being conducted.
Figure 16:
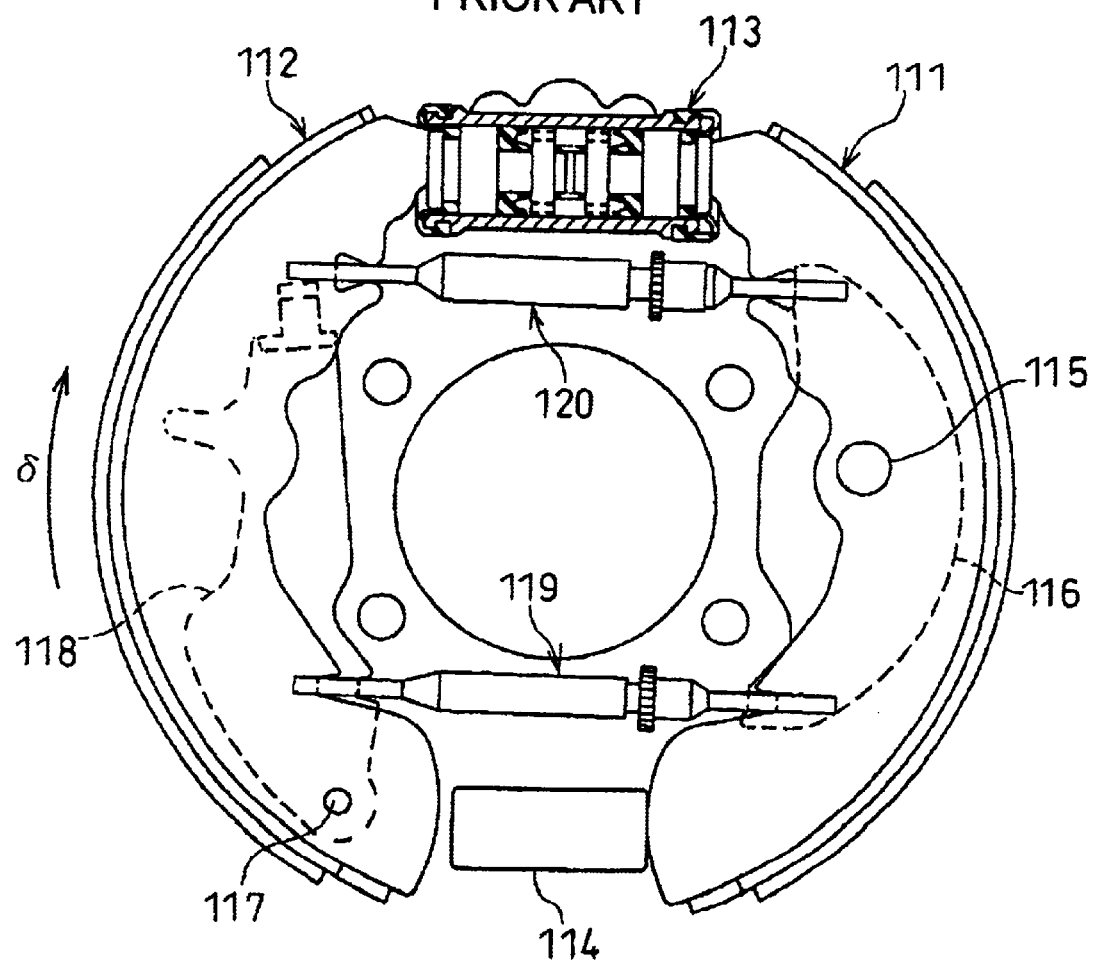
FIG. 16 is a schematic view of a conventional dual mode drum brake device under the condition of receiving a drum rotational force in the other direction after the parking brake operation is being conducted.

FIG. 11 shows further another embodiment of this invention. A unit comprising the strut 21 and a cross-pull type brake lever 41 is pivotally supporting each other just like described in FIG. 9 and is laterally similarly positioned as in FIG. 8. The strut 21 is extended between the free end 12c of the pivot lever 12 adjacent to the cylinder device 9 and the end portion of the brake shoe 3, and the strut 43 with the incremental type stroke adjustment mechanism as described in FIGS. 8 and 10 is positioned laterally opposite to FIG. 8 but is extended between the free end 12e of the pivot lever 12 adjacent to the anchor 8 and the end portion of the brake shoe 3.

Further, the actuating end 41a of the brake lever 41 is engaged with the notched groove 12g on the free end 12c of the pivot lever 12 while the operating end 41b of the brake lever 41 projects outside of the back plate 1, the corresponding end of the brake shoe 3 is engaged with the notched groove 21a at the end of the strut 21 away from the brake lever 41. The strut 43 comprises the tubular member 44, the adjustment bolt 45 and the socket member 46 as described in FIG. 10. The notched groove 44a of the tubular member 44 is engaged with the free end 12e of the pivot lever 12 adjacent to the anchor 8, and the notched groove 46a of the socket member 46 is engaged with web 3a of the brake shoe 3 adjacent to the anchor 8 with a slight clearance.

The fork-like adjustment lever 47, its pivot end is pivotally supported on the web 3a of the brake shoe 3 by the pin 48, and the spring 49 is stretched between the arm 47b of the adjustment lever 47 and the brake shoe 3 to energize and to rotate the adjustment lever 47 in a counterclockwise direction in FIG. 11. At the same time, the strut 43 is moved to the right, the pivot lever 12 rotates in a counterclockwise direction with the protuberance 12a as the fulcrum, and the brake lever 41 and the strut 21 are energized to the left. The rotation of the adjustment lever 47 by the spring 49 is restricted by abutting against the arm 47a on the socket member 46, and the arm 47b of the adjustment lever 47 is rotatably engaged with the toothed ring 45c of the adjustment bolt 45.

Regarding the operation of the dual mode drum brake device according to the above embodiment, the service brake operation due to the hydraulic operation of the cylinder device 9 is the same as that described in the respective embodiment, thereby functioning as a leading trailing type brake.

Parking brake operation is explained next. An application force of the parking brake generated by a driver acts on the far side at a right angle of FIG. 11 relative to the operating end 41b of the brake lever 41. Here, the brake lever 41 pushes the end of the brake shoe 3 adjacent to the cylinder device 9 to the left in FIG. 11 via the strut 21, thereby rotating the same outwardly around the abutment point with the anchor 8 and pushing the free end 12c of the pivot lever 12 adjacent to the cylinder device 9 while the brake shoe 3 acts as the reaction force receiver. A right side movement of the free end 12c of the pivot lever 12 pushes the brake shoe 2 via the protuberance 12a also to the right, and the brake shoe 2 rotates outwardly around the abutment point with the anchor 8 because of the moment difference of the shoe return springs 6, 7.

Accordingly, the brake shoes 2, 3 rotate outwardly simultaneously at the service brake operation and frictionally engage with the inner circumferential surface of the brake drum.

Under this condition, when the brake drum generates clockwise or counterclockwise rotational force in FIG. 11, the brake shoe 3 or 2, i.e., a primary brake shoe, is carried and rotates with the brake drum, and the rotational force of the brake drum is transmitted to the remaining brake shoe 2 or 3, a secondary brake shoe, via the pistons 10, 11 and the joint member of the cylinder device 9, thereby ultimately receiving the rotational force of the brake drum at the anchor 8. Accordingly, during the parking brake operation, both brake shoes 2, 3 together function as leading brake shoes, thereby operating as a duo servo type brake.

Upon releasing the parking brake operation, the parking brake mechanism receives the spring force from the shoe return springs 6, 7 via the brake shoes 2, 3 and returns to the initial position in FIG. 11 to separate the brake shoes 2, 3 apart from the inner circumferential surface of the brake drum, thereby releasing the service brake.

Further, the stroke adjustment of the brake lever 41 may similarly be conducted to the above-description when the wearing of the linings 2c, 3c proceeds and the amount of outward rotation of both brake shoes 2, 3 due to the cylinder device 9 during the service brake operation becomes larger, thereby preventing the extension of the stroke of the brake lever 41 even if the linings 2c, 3c are wearing out.

Therefore, the dual mode drum brake device of this embodiment operates the same as the above-described embodiment, thereby functioning as a leading trailing type brake during the service brake operation while functioning as a duo servo type brake during the parking brake operation; therefore the same effect during the parking brake operation as the above described embodiment is attained. In addition, the dual mode drum brake device of this embodiment makes an engagement between the free end 12c of the pivot lever 12 adjacent to the cylinder device 9 and the brake lever 41 and between the brake lever 41 and the corresponding end portion of the strut 21. Therefore, substitution of a leading trailing type drum brake device having a cross-pull type brake lever at the side near the cylinder device is facilitated without rearranging the brake cable.

As is evident from the explanation of the respective above embodiments, the brake lever 14(41) may be engaged with an end of either brake shoe 2 or 3, leaving no restriction with respect to the arrangement of the paring brake lever 14(41). Therefore, the structure of the conventional device typically engaging the free end of the brake shoe 3 or 2 adjacent to the cylinder device 9 with the brake lever 14(41) may be employed, which increases the flexibility and eliminates the necessity of brake cable rearrangement.

As necessary, regardless of the above common knowledge, the brake lever 14(41) may be positioned without restriction, which increases the degree of freedom and becomes effective. While the foregoing invention has been shown and described with reference to several preferred embodiments, it will be understood that various changes in form and detail may be made without departing from the spirit and scope of the present invention.

It is readily apparent that the above-described invention has the advantages of wide commercial utility. It may be understood that the specific form of the invention hereinabove described is intended to be representative only, and certain modifications within the scope of these teachings will be apparent to those skilled in the art without departing from the spirit and scope of the invention.

Accordingly, reference should be made to the following claims in determining the full scope of the invention.

I claim:

1. A dual mode drum brake device comprising:

a pair of brake shoes positioned to face each other and to be frictionally engaged with an inner circumferential surface of a brake drum, each brake shoe has a first brake shoe end and a second brake shoe end respectively, a cylinder device positioned between a pair of the first adjacent brake shoe ends while a fixed anchor positioned between a pair of the second adjacent brake shoe ends; said cylinder device acts during a service brake operation to advance pistons at a pair of cylinder ends so that said pistons spread said brake shoes apart about abutment points between said pair of the second adjacent brake shoe ends and said anchor to frictionally engage with said inner circumferential surface of said brake drum, a pivot lever is pivotally positioned between the ends of one of the brake shoes; said pivot lever moves along a plane surface which makes a right angle to a brake drum rotational axis, an anchor side strut is extended between a first free end of said pivot lever and said second brake shoe end of the other of the brake shoes while a cylinder side strut is extended between a second free end of said pivot lever and said first brake shoe end of said other of the brake shoes and positioned inwardly relative to said cylinder device so that an operating force of a parking brake lever is transmitted to both brake shoes as an outward force in a radial direction of said brake drum, thereby enabling said operating force of said parking brake lever to separate said brake shoes apart, wherein a force transmitting member is extended between said pair of the first adjacent brake shoe ends and positioned outwardly relative to said cylinder side strut; said force transmitting member transmits a rotational force of the brake drum while a parking brake action is engaged from either of the brake shoes positioned at a primary side relative to the brake drum rotational direction to a remaining brake shoe positioned at a secondary side relative to said brake drum rotational direction, a shoe clearance adjustment device adjusting clearances between said brake shoes and said inner circumferential surface of said brake drum is extended between said pistons of said cylinder device so as to enable said pistons and said shoe clearance adjustment device to move integrally while the parking brake action is engaged, and said force transmitting member is composed of said two pistons and said shoe clearance adjustment device.

2. The dual mode drum brake device as claimed in claim 1, wherein said parking brake lever engages with said other of the brake shoes at said first brake shoe end, and said parking brake lever engages with an end of the said cylinder side strut adjacent to said other of the brake shoes.

3. The dual mode drum brake device as claimed in claim 1, wherein said parking brake lever engages with said other of the brake shoes at said second brake shoe end, and said parking brake lever engages with an end of said anchor side strut adjacent to said other of the brake shoes.

4. The dual mode drum brake device as claimed in claim 1, wherein said parking brake lever engages with said first free end of said pivot lever, and said parking brake lever engages with an end of said anchor side strut adjacent to one of the brake shoes.

5. The dual mode drum brake device as claimed in claim 1, wherein said shoe clearance adjustment device is an automatic shoe clearance adjustment device responding to an amount of outward movement of said brake shoes and automatically adjusting said clearances.

6. The dual mode drum brake device as claimed in claim 1, wherein said parking brake lever engages with said second free end of said pivot lever, and said parking brake lever engages with an end of said cylinder side strut adjacent to one of the brake shoes.

* * * * *